United States Patent
Schulte et al.

(10) Patent No.: US 12,525,861 B2
(45) Date of Patent: *Jan. 13, 2026

(54) METHOD FOR PROCESSING AN OBJECT WITH THE AID OF A PLANAR DRIVE SYSTEM

(71) Applicant: BECKHOFF AUTOMATION GMBH, Verl (DE)

(72) Inventors: Felix Schulte, Rietberg (DE); Johannes Beckhoff, Schloß Holte-Stukenbrock (DE); Hans Beckhoff, Verl (DE)

(73) Assignee: Beckhoff Automation GmbH, Verl (DE)

( * ) Notice: Subject to any disclaimer, the term of this patent is extended or adjusted under 35 U.S.C. 154(b) by 57 days.

This patent is subject to a terminal disclaimer.

(21) Appl. No.: 18/478,171

(22) Filed: Sep. 29, 2023

(65) Prior Publication Data

US 2024/0055969 A1     Feb. 15, 2024

Related U.S. Application Data

(63) Continuation of application No. PCT/EP2022/059689, filed on Apr. 12, 2022.

(30) Foreign Application Priority Data

Apr. 12, 2021   (DE) ............. 10 2021 108 988.3

(51) Int. Cl.
*H02P 1/54*   (2006.01)
*B01F 29/15*   (2022.01)
(Continued)

(52) U.S. Cl.
CPC ........... *H02K 41/031* (2013.01); *B01F 29/15* (2022.01); *B01F 29/31* (2022.01);
(Continued)

(58) Field of Classification Search
CPC ...... H02P 25/064; H02P 25/22; H02K 41/031
See application file for complete search history.

(56) References Cited

U.S. PATENT DOCUMENTS

| 8,686,602 B2 | 4/2014 | Pelrine et al. |
| 9,233,800 B2 | 1/2016 | Senn et al. |
| (Continued) | | |

FOREIGN PATENT DOCUMENTS

| CN | 101623608 A | 1/2010 |
| CN | 219990548 U | * 11/2023 |
| (Continued) | | |

OTHER PUBLICATIONS

Office Action dated Jan. 31, 2022 in connection with German patent application No. 10 2021 108 988.3, 10 pages including English translation.

(Continued)

*Primary Examiner* — Karen Masih
(74) *Attorney, Agent, or Firm* — Dorsey & Whitney LLP

(57) ABSTRACT

A method is provided for processing an object with the aid of a planar drive system. The planar drive system comprises at least one stator assembly, each having a plurality of coil groups for generating a stator magnetic field, a stator surface above the stator assembly, and at least one rotor comprising a plurality of magnet units for generating a rotor magnetic field. The planar drive system further comprises at least one rotational position, where the rotor is rotatable about a rotational axis perpendicular to the stator surface in the rotational position. The rotational position is determined based on a point of contact of four stator assemblies. The method comprises energizing the coil groups in such a way that the rotor moves to the rotational position, energizing the coil groups in such a way that the rotor rotates, and processing of the object with the aid of the rotor rotation.

18 Claims, 23 Drawing Sheets

(51) Int. Cl.
*B01F 29/31* (2022.01)
*B01F 35/32* (2022.01)
*B04B 9/02* (2006.01)
*B05D 1/00* (2006.01)
*H02K 41/03* (2006.01)
*H02P 25/064* (2016.01)
*B01F 29/83* (2022.01)

(52) U.S. Cl.
CPC ............ *B01F 35/3204* (2022.01); *B04B 9/02* (2013.01); *B05D 1/005* (2013.01); *H02P 25/064* (2016.02); *B01F 29/83* (2022.01); *H02K 2201/18* (2013.01)

(56) References Cited

U.S. PATENT DOCUMENTS

| | | | |
|---|---|---|---|
| 9,878,813 | B2 | 1/2018 | Eberhardt et al. |
| 10,116,195 | B2 | 10/2018 | Lu |
| 11,437,902 | B2 | 9/2022 | Brinkmann et al. |
| 2008/0067415 | A1 | 3/2008 | Asano |
| 2010/0257823 | A1 | 10/2010 | Lang |
| 2014/0254302 | A1 | 9/2014 | Yang |
| 2017/0179805 | A1 | 6/2017 | Lu |
| 2017/0294827 | A1 | 10/2017 | Rubin |
| 2021/0328493 | A1 | 10/2021 | Luthe et al. |
| 2023/0271738 | A1 | 8/2023 | Neubauer et al. |
| 2023/0283212 | A1 | 9/2023 | Stockem et al. |
| 2024/0051698 | A1 | 2/2024 | Schulte et al. |

FOREIGN PATENT DOCUMENTS

| | | | | |
|---|---|---|---|---|
| DE | 102010018153 | A1 | 10/2011 | |
| DE | 102017131304 | A1 | 6/2019 | |
| DE | 102018129731 | A1 | 5/2020 | |
| DE | 102019117431 | A1 | 12/2020 | |
| DE | 102020130795 | A1 | 5/2022 | |
| EP | 0571980 | A2 | 12/1993 | |
| EP | 3656684 | A1 | 5/2020 | |
| GB | 1273885 | A | 5/1972 | |
| JP | 4949801 | B2 | 3/2012 | |
| WO | 2013112759 | A1 | 8/2013 | |
| WO | 2015179962 | A1 | 12/2015 | |
| WO | 2016012159 | A1 | 1/2016 | |
| WO | 2016012160 | A1 | 1/2016 | |
| WO | 2021115545 | A1 | 6/2021 | |
| WO | WO-2022238429 | A1 * | 11/2022 | ........... H02K 5/1282 |

OTHER PUBLICATIONS

Berkelman, et al. "Magnet Levitation and Trajectory Following Motion Control Using a Planar Array of Cylindrical Coils," DSCC, Oct. 20, 2008.

International Search Report and Written Opinion dated Dec. 5, 2022 in connection with International Patent Application No. PCT/EP2022/059689, 46 pages including English translation.

Partial International Search Report and Written Opinion dated Dec. 5, 2022 in connection with International Patent Application No. PCT/EP2022/059689, 34 pages including English translation.

Office Action dated Jan. 31, 2022 in connection with German patent application No. 10 2021 108 987.5, 12 pages including English translation.

International Search Report and Written Opinion dated Aug. 19, 2022 in connection with International Patent Application No. PCT/EP2022/059688, 20 pages including English translation.

* cited by examiner

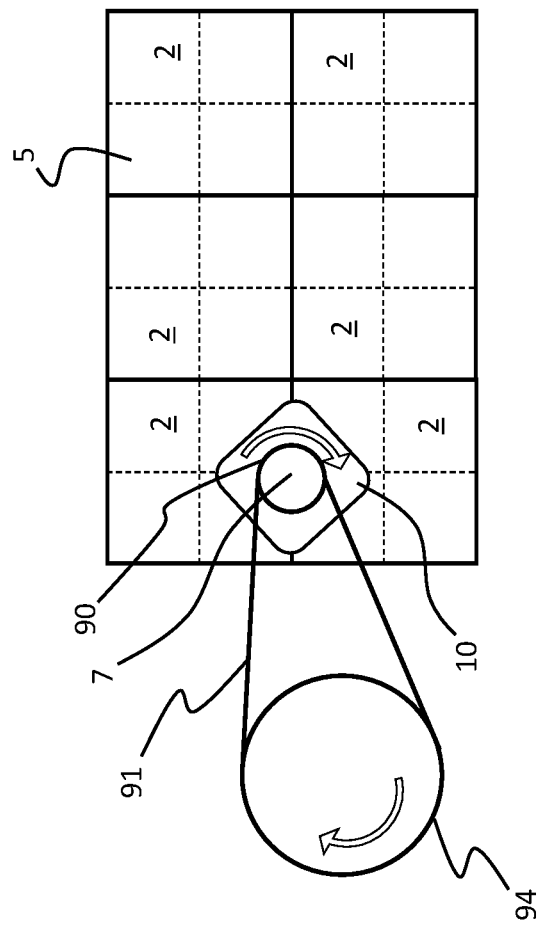
Fig. 22

METHOD FOR PROCESSING AN OBJECT WITH THE AID OF A PLANAR DRIVE SYSTEM

CROSS-REFERENCE TO RELATED APPLICATIONS

This patent application is a continuation of International Patent Application PCT/EP2022/059689, filed Apr. 12, 2022, entitled METHOD FOR MACHINING AN OBJECT BY MEANS OF A PLANAR DRIVE SYSTEM, which claims the priority of German patent application DE 10 2021 108 988.3, filed Apr. 12, 2021, entitled VERFAHREN ZUM BEARBEITEN EINES OBJEKTS MITTELS EINES PLANARANTRIEBSSYSTEMS, each of which is incorporated by reference herein, in the entirety and for all purposes.

FIELD

The invention relates to a method for processing an object with the aid of a planar drive system. The invention further relates to a controller configured to carry out the method according to the invention and to a planar drive system comprising such a controller.

BACKGROUND

Planar drive systems may be used, among other things, in automation technology, especially in manufacturing technology, handling technology and process engineering. Planar drive systems may be used to move or position a moving element of a system or machine in at least two linearly independent directions. Planar drive systems may comprise a permanently energized electromagnetic planar motor with a planar stator and a rotor movable on the stator in at least two directions.

In a permanently energized electromagnetic planar motor, a driving force is exerted on the rotor by the fact that energized coil groups of the stator assembly interact magnetically with driving magnets of a plurality of magnet arrangements of the rotor. Planar drive systems having rectangular and elongated coil groups and rectangular and elongated magnet units of the rotor are known from the prior art. Such a planar drive system is described, for example, in the publication document DE 10 2017 131 304 A1. With the aid of such a planar drive system, in particular a linear and translational movement of the rotor becomes possible. This means that with the aid of such a planar drive system, the rotor may be moved freely above a stator surface below the rectangular and elongated coil groups, in parallel to the stator surface and perpendicular to the stator surface at least at different distances from the stator surface. Furthermore, such a planar drive system is capable of tilting the rotor by a few degrees and rotating it by a few degrees. The latter movements may be carried out above arbitrary positions of the stator surface. In particular, the rotor may be rotated from a normal position by up to 20°. A complete rotation of the rotor is not possible above arbitrary positions of the stator surface.

Planar drive systems with round coil groups are known from the prior art, Proceedings of DSCC2008 2008 ASME Dynamic Systems and Control Conference Oct. 20-22, 2008, Ann Arbor, Michigan, USA. Coil groups having a round embodiment are advantageous for the rotation of the rotor, but have significant disadvantages for the linear translational movement of the rotor and may lead to unsteady and jerky traversing motions.

SUMMARY

The invention provides a method for processing an object with the aid of a planar drive system in which a rotor rotation is used. The invention provides a controller for the planar drive system, via which the method may be controlled. The invention provides a planar drive system having such a controller.

According to a first aspect, a method for processing an object with the aid of a planar drive system, the planar drive system comprising at least one stator assembly with a plurality of coil groups in each case for generating a stator magnetic field, a stator surface above the stator assembly, and at least one rotor with a plurality of magnet units for generating a rotor magnetic field, wherein the planar drive system comprises at least one rotational position, wherein in the rotational position the rotor may be rotated about an axis of rotation perpendicular to the stator surface, wherein the rotational position is determined on the basis of a point of contact of four stator assemblies, comprising the following steps: Energizing the coil groups in such a way that the rotor moves to the rotational position; energizing the coil groups in such a way that the rotor rotates; and processing the object with the aid of the rotor rotation.

According to a second aspect, a planar drive system comprises at least one stator assembly each comprising a plurality of coil groups for generating a stator magnetic field, and a stator surface, further comprising at least one rotor having a plurality of magnet units for generating a rotor magnetic field, wherein the rotor may be driven above the stator surface with the aid of a magnetic coupling between the stator magnetic field and the rotor magnetic field, wherein the planar drive system further comprises the controller, wherein the controller outputs the control commands to the stator assemblies of the planar drive system to energize the coil groups in such a way that the rotor moves to the rotational position and then rotates, wherein an object positioned on the rotor is processed with the aid of the rotor rotation.

According to a third aspect, a planar drive system comprises at least one stator assembly each comprising a plurality of coil groups for generating a stator magnetic field, and a stator surface, further comprising at least one rotor having a plurality of magnet units for generating a rotor magnetic field, wherein the rotor may be driven above the stator surface with the aid of a magnetic coupling between the stator magnetic field and the rotor magnetic field, wherein the planar drive system further comprises the controller, wherein the controller outputs the control commands to the stator assemblies of the planar drive system to energize the coil groups in such a way that the rotor rotates, wherein the rotor comprises a bucket wheel, wherein rotation of the rotor with the bucket wheel causes a fluid flow.

Examples

A planar drive system comprises at least one stator assembly having a plurality of coil groups for generating a stator magnetic field, a stator surface above the stator assembly, and at least one rotor with a plurality of magnet units for generating a rotor magnetic field. The coil groups may be embodied as rectangular and elongated coil groups. The at least one stator assembly may be embodied in such a way that the plurality of coil groups have two mutually different main directions of extension at right angles to one another and the magnet units of the rotor are also arranged at right angles to each other. By energizing the coil groups, the rotor may then be moved above the stator surface in the two main directions of extension.

Furthermore, vector-wise superposition of the two movements and thus free positioning of the rotor above the stator surface is also possible. In this context, as implemented in the planar drive system marketed by the applicant under the name XPLANAR, it may be provided that the stator surface is composed of upper surfaces of a plurality of stator modules and four stator assemblies are provided in each stator module. The planar drive system comprises at least one rotational position, wherein the rotor may be rotated about an axis of rotation perpendicular to the stator surface in the rotational position. The rotational position is determined based on a contact point of four stator assemblies. In a method for processing an object with the aid of such a planar drive system, the following steps are carried out:

Energizing the coil groups in such a way that the rotor moves to the rotational position;
Energizing the coil groups in such a way that the rotor rotates;
Processing the object with the aid of the rotor rotation.

This method allows for the object positioned on the rotor to be processed with the aid of the rotor rotation. If a plurality of rotational positions are provided above the stator surface, it may be provided that the coil groups are energized in such a way that the rotor moves into one of the rotational positions, thus providing a flexible system for processing the object. For example, it may be provided that a plurality of rotors each carry an object and wait in a kind of queue for a free rotational position, then are moved to the free rotational position, rotate there and thereby process the object, and are subsequently moved further within the planar drive system.

In an embodiment of the method, the object is a vessel inserted into the vessel holder of the rotor. A liquid or a substance may be arranged within the vessel, and the processing of the object with the aid of the rotor rotation may particularly relate to the contents of the vessel, for example the liquid or the substance. In an embodiment of the method, the rotation of the rotor mixes a liquid or separates substances in the vessel. In this case, the rotor with the vessel and the vessel holder e.g. act like a centrifuge and may thus be used efficiently in an automation system, for example in production engineering, handling technology or process engineering. If the vessel were transported by another transport system, a centrifuge-like process step would require the vessel to be removed from the transport system and placed in a centrifuge and then returned to the transport system after centrifugation. If the centrifuging step may be carried out directly with the vessel positioned on the rotor, these transfer steps are eliminated and an overall more efficient process for processing the object is provided. Due to the fact that the rotor may float freely above the stator surface and no mechanical connections are provided between the rotor and the stator surface, free rotation of the rotor may be allowed for, as a result of which overall processes requiring a centrifuge step may be easily implemented with the aid of such a planar drive system.

In an embodiment of the method, the vessel holder comprises a plurality of inserted vessels. The vessel holder with the inserted vessels is embodied in a rotation-symmetrical manner about an axis. The axis is guided through a center point of the rotor. This allows for a simple embodiment of a planar drive system having a centrifuge function and a plurality of vessels per rotor. As a result, the overall throughput may be increased.

In an embodiment of the method, a bucket wheel is rotatably mounted within the vessel. A bucket wheel rotational axis is in parallel to the rotor rotational axis and guided by the rotational position when the rotor is arranged in the rotational position. In this embodiment, it may be provided that the bucket wheel stirs a liquid within the vessel. The bucket wheel may be driven in this case by varying a rotational speed of the rotor and, due to the mass inertia, the bucket wheel has, at least at some times, a different rotational speed than the vessel arranged on the rotor. In this context, it may be provided that initially the rotor is accelerated and the bucket wheel initially rotates slower than the rotor until the inertia is overcome and the bucket wheel rotates at the same angular velocity as the rotor. Subsequently, the angular velocity of the rotor may be reduced, wherein, due to inertia, the bucket wheel initially continues to rotate faster than the rotor until the angular velocity of the bucket wheel has again adapted to the vessel. Now the angular velocity of the rotor may be increased again and the bucket wheel again rotates slower than the vessel until the angular velocity has adjusted again. By further continuing this procedure, efficient agitation of the liquid in the vessel may be achieved.

In an embodiment of the method, the rotor comprises a bucket wheel. Rotation of the rotor with the bucket wheel causes a fluid flow. The fluid flow may e.g. comprise a liquid flow or a gas flow. The gas flow, which may e.g. be an air flow, may be used to cool an object. In this regard, it may be provided that the rotor with the bucket wheel is part of a planar drive system, wherein the object is moved within the planar drive system with the aid of other rotors and cooling may be achieved in certain positions by causing a gas flow, for example. For this purpose, it may be provided that the rotor with the object is moved to a predetermined position and the rotor with the bucket wheel is moved to an adjacent rotational position. In this way, a flexible system may be achieved in which the rotor with the bucket wheel cools different objects at different rotational positions, thereby achieving a more flexible system compared to an automation system with a fixed fan at specific positions.

In an embodiment of the method, the rotor with object is moved to a dispensing unit for a liquid prior to rotation. A liquid is applied to the object and then a rotational coating (also referred to as spin coating) of the liquid is created on the object by the rotational movement of the rotor in the rotational position. The fact that the rotational movement of the rotor may be carried out within the planar drive system also in this case eliminates the need to transfer the object from a transport system to a rotating system and back again, since the object may remain arranged on the rotor throughout the entire process. This also allows for a much more flexible setup of the planar drive system if rotational coating of an object is necessary during a processing operation.

In an embodiment, the rotor comprises a turnstile that extends beyond the dimensions of the rotor. Objects are influenced with the aid of the turnstile. For example, objects may be stopped or passed on with the aid of the turnstile.

In an embodiment, the turnstile influences an object flow. For example, objects may be moved on a roller track along the planar drive system and stopped by the turnstile. By rotating the rotor, the turnstile may now be moved further and, for example, push an object further along the roller track, thereby influencing the object flow. It may be provided that the turnstile influences objects of the object flow with regard to an object distance.

It may also be provided that different objects are moved on the transport system adjacent to the planar drive system and that a separate turnstile is provided for each of these different objects. In this case, it may be provided that a controller moves rotors with different turnstiles into the rotational position in such a way that the turnstile matching the current object is arranged in the rotational position in each case. If the corresponding object is now moved further and the following object requires a different turnstile, the rotor with the current turnstile may be moved away and another rotor with a different turnstile may be moved into the rotational position. This allows a flexible for a setup of an object influencing system.

In an embodiment of the method, a camera is used to determine an alignment of the object placed on the rotor. An alignment of the object is achieved by rotating the rotor. In particular, it may be provided that the object may be arranged on the rotor in four different alignments, each in 90° steps. By rotating the rotor, it may be achieved that all objects on all rotors are brought into a predetermined alignment. Each rotor may thus e.g. be rotated by 0°, 90°, 180° or 270° and may thus move the object on in the correct orientation.

A controller for a planar drive system comprises a computing unit and is set up to output control signals. The control signals comprise energizing information for the coil groups of a stator assembly. The coil groups are energized on the basis of the control signals in such a way that the method according to the invention is executed. The computing unit may be used to calculate the energizing information on the basis of further information such as position data of the rotors and information on the objects arranged on the rotors. Signals from further sensors, such as the camera already described or other sensors, may also be available to the computing unit.

A planar drive system comprises at least one stator assembly with a plurality of coil groups for generating a stator magnetic field. The coil groups may be embodied as rectangular and elongated coil groups. In addition, the planar drive system comprises a stator surface comprising the at least one stator assembly. The planar drive system further comprises at least one rotor and a plurality of magnet units for generating a rotor magnetic field. The rotor is drivable above the stator surface via a magnetic coupling between the stator magnetic field and the rotor magnetic field. The planar drive system further comprises the controller according to the invention. The controller outputs the control commands to the stator assemblies of the planar drive system.

In an embodiment, the planar drive system comprises at least one stator module. At least one stator assembly is arranged within the stator module. It may be provided that the control commands are output to the stator module or modules and that the stator modules comprise a control for energizing the coil groups.

In an embodiment, four stator assemblies are arranged in each stator module. The stator assemblies are arranged in a square configuration, with the stator module having a square top surface. In this case, the top side is part of the stator surface. The rotational position is arranged at the center of a stator module, at the center of an outer edge of a stator module, or at a corner of the stator module. Four stator assemblies meet at each of these points, so that a rotational position exists at these positions, i.e. the rotor may be rotated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 22 shows a planar drive system for transmitting rotary motion.

DETAILED DESCRIPTION

Figure 1:
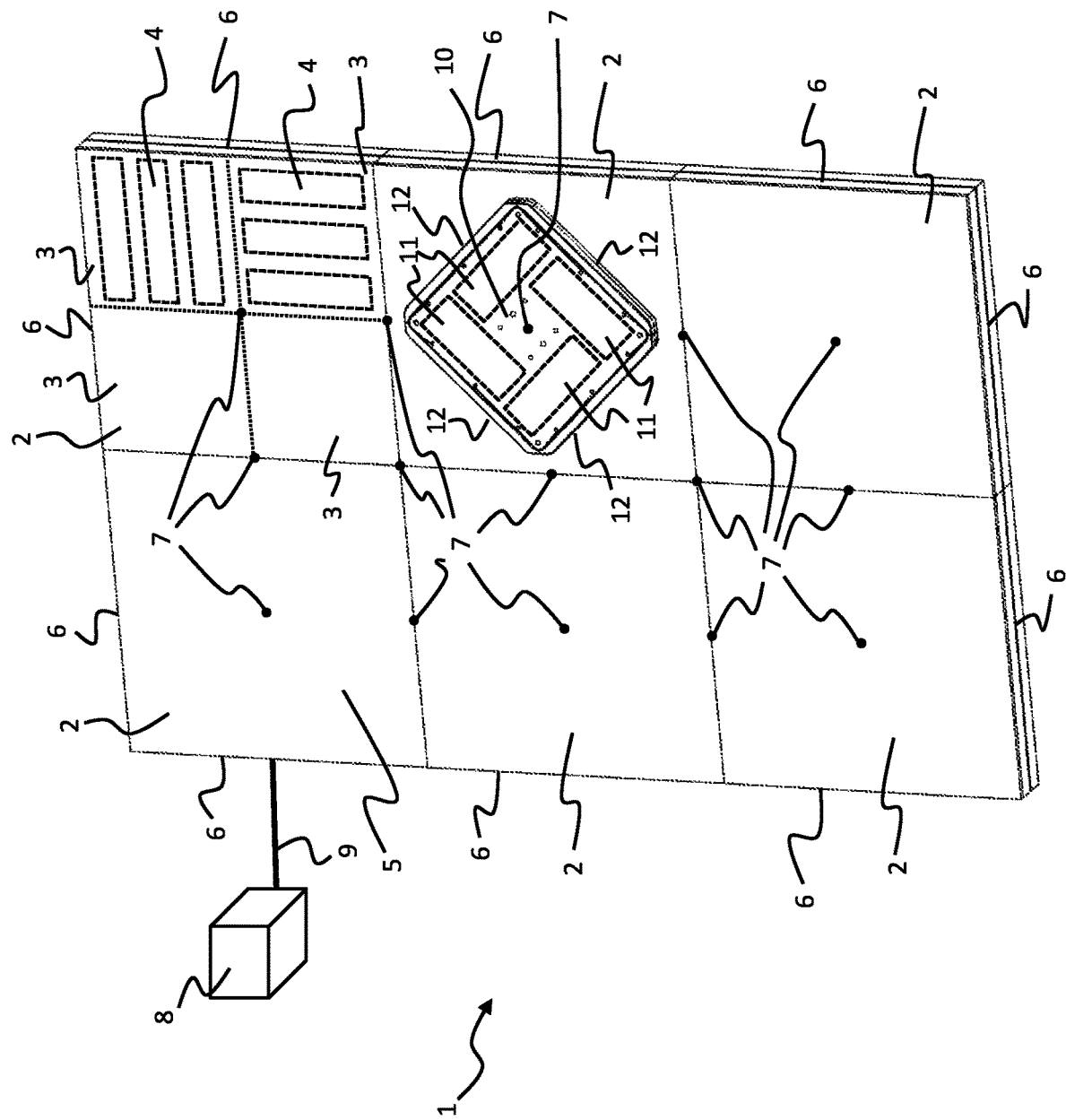
FIG. 1 shows a planar drive system having a rotor and rotational positions.

FIG. 1 shows a planar drive system 1 with the aid of which the method according to the invention for processing an object may be carried out. The planar drive system 1 shown in FIG. 1 comprises six stator modules 2, the stator modules 2 being arranged in such a way that a rectangle of two on three stator modules 2 is formed. Other arrangements of the stator modules 2 are conceivable, as well, and more or fewer than six stator modules 2 may be arranged. In the stator module 2 shown at the top right, an interior of the stator module 2 is indicated, wherein the stator module 2 comprises four stator assemblies 3, the four stator assemblies 3 being arranged within a stator module 2 in a square two-on-two arrangement.

Furthermore, for two stator assemblies 3, it is shown that the stator assemblies 3 comprise coil groups 4, wherein the coil groups 4 are shown with different alignments. The coil groups 4 are used to generate a stator magnetic field. In the embodiment shown, the coil groups 4 are rectangular and elongated. In each stator assembly 3 of the stator modules 2, three individual rectangular and elongated coils of a coil group 4 are shown. Likewise, a different number of individual rectangular and elongated coils could form a coil group 4. In this case, their longitudinal extension is oriented in parallel to one of the edges of the respective stator assembly 3.

Below each of the illustrated coil groups 4, further coils are provided which have an alignment rotated by 90° with respect to their longitudinal extension. This grid of longitudinally extended and rectangular coils of a coil group 4 may be formed one above the other several times. In real terms, neither stator assemblies 3 nor coil groups 4 are visible, since they are surrounded by a housing of the stator module 2. The six stator modules 2 form a continuous stator surface 5 above the stator assemblies 3. Furthermore, a rotor 10 is arranged, the rotor comprising a plurality of magnet units 11 for generating a rotor magnetic field. The coil groups 4 may interact with the magnet units 11 when an appropriate current is applied, thereby moving the rotor 10 within the planar drive system 1 above the stator surface 5. A plane of movement for the rotor 10 is thus defined by the stator surface 5. The coil groups 4 are arranged parallel to the outer edges 6. Since the stator modules 2 each have outer edges 6 at 90° to each other, two different orientations of the coil groups 4 are therefore necessary for the movement of the rotor 10.

The depiction in FIG. 1 is simplified, since in each stator assembly 3 a plurality of coil groups 4 are arranged, which are in each case arranged at 90° with regard to each other, however only one coil group 4 is depicted in each case. The magnet units 11 are arranged in parallel to rotor outer edges 12 of the rotor 10. Furthermore, the magnet units 11 are arranged circumferentially within the rotor 10 at the rotor outer edges 12 and may interact with the coil groups 4, respectively, to move the rotor parallel to the outer edges 6 of the stator modules 2. Furthermore, superposition of two movements parallel to the outer edges 6 is possible, so that the rotor 10 may be moved in all directions parallel to the stator surface 5. The arrangement of four stator assemblies 3 within a stator module 2 corresponds to the stator modules 2 for a planar drive system 1 marketed by the applicant under the name XPLANAR. It may alternatively be envisaged to arrange more or fewer stator assemblies 3 within a stator module 2. For example, each stator module 2 may comprise only one stator assembly 3 or may comprise more than four stator assemblies 3.

The planar drive system 1 comprises a plurality of rotational positions 7. In this context, the rotational positions 7 are always arranged in such a way that four stator assemblies 3 touch one another in the rotational position 7. In particular, this means that corner points of the stator assemblies 3 define the rotational positions 7 in each case, with the rotational positions 7 always being arranged at the locations in which four corners of the stator assemblies 3 meet. In particular, this may be in the center of the stator modules 2, in a center of the outer edges 6 of the stator modules 2 or in corner areas of the stator modules 2. Outside of the rotational positions 7, a rotation of the rotor 10 is restricted.

Thus, outside of the rotational positions 7, rotors 10 may only be rotated from a resting position up to a predetermined angle, for example 15° or 20°, with the rotor outer edges 12 being in parallel to the outer edges 6 in the resting position. In the rotational positions 7, free rotation of the rotor 10 is possible, and illustrated in FIG. 1 by the fact that the rotor has executed a rotation of 45°. Thus, the alignment of the rotor 10 shown in FIG. 1 is only achievable in a rotational position 7. In FIG. 1, the rotor 10 is located in the center of a stator module 2 and thus also in a rotational position 7.

Also shown in FIG. 1 is a controller 8 and a communication line 9, the controller 9 being connected to one of the stator modules 2 by the communication line 9. It may be provided in this context that the stator modules 2 may forward communication signals to one another. Alternatively, a plurality of communication lines 9 may be provided, in which case each stator module 2 may be connected to the controller 8. The controller 8 is set up to output control commands to the stator modules 2 via the communication line 9, the stator modules 2 being set up to energize the coil groups 4 on the basis of the control signals and thereby to control a movement of the rotor 10 parallel to the stator surface 5 into a rotational position 7 and, when the rotor 10 is arranged in the rotational position 7, to energize the coil groups 4 in such a way that the rotor 10 rotates. The coil groups 4 may further be energized in such a way that the rotor 10 is moved perpendicularly to the stator surface 5.

The planar drive system 1 shown in FIG. 1 may be used in automation technology, in particular in manufacturing technology, handling technology and process engineering, in order to process objects. For example, the objects may be arranged on the rotor 10 or held above the stator surface 5 by a holder and processed accordingly by the rotor 10. The fact that the rotor 10 may execute a rotary movement in the rotational position 7 results in advantageous new embodiments for possible object processing, which will be described in more detail below. For this purpose, it may be provided that a processing element is arranged above the stator surface 5 and a spatial arrangement of the processing element is predetermined by the rotational position 7 in which the rotor 10 is to be rotated. An object may be processed with the aid of the rotor rotation, wherein the processing element also acts upon the object. Furthermore, it may be provided that the processing element and the rotor 10 are moved relative to each other in parallel to an axis of rotation during the rotor rotation.

As the case may be, the further figures contain the reference numerals explained in connection with FIG. 1. In the further description, as the case may be, these reference numerals will not be discussed further, since the parts of the planar drive system 1 described by these reference numerals have explained in connection with FIG. 1.

Figure 2:
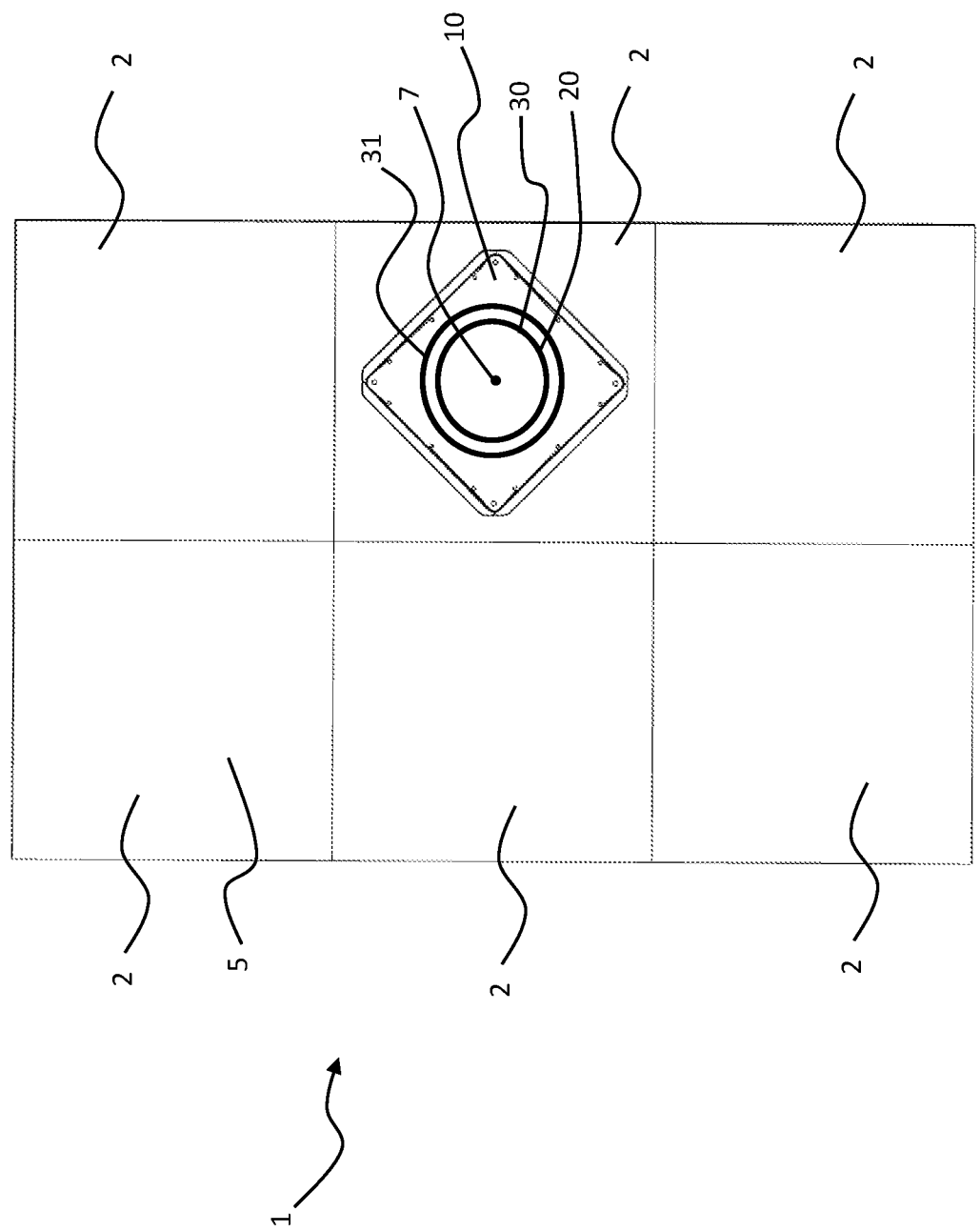
FIG. 2 shows a top view of planar drive system during rotation.

FIG. 2 shows a top view of a planar drive system 1 having six stator modules 2 that form a stator surface 5. A rotor 10 is arranged in a rotational position 7 analogous to FIG. 1. An object 20, in this case a vessel 30, is arranged on the rotor 10. The vessel 30 is attached to the rotor 10 with the aid of a vessel holder 31. During rotation of the rotor 10, the object 20 may be processed by the rotation. The processing may particularly relate to a content of the vessel 30.

In FIG. 2, the rotor 10 is arranged at a 45° angle. This means that the rotor 10 is currently being rotated. Thus, control signals were first output by the controller 8, with the aid of which the coil groups 4 were energized in such a way that the rotor 10 has moved to the rotational position 7, and then control signals are output, with the aid of which the coil groups 4 are energized in such a way that the rotor 10 rotates.

Figure 3:
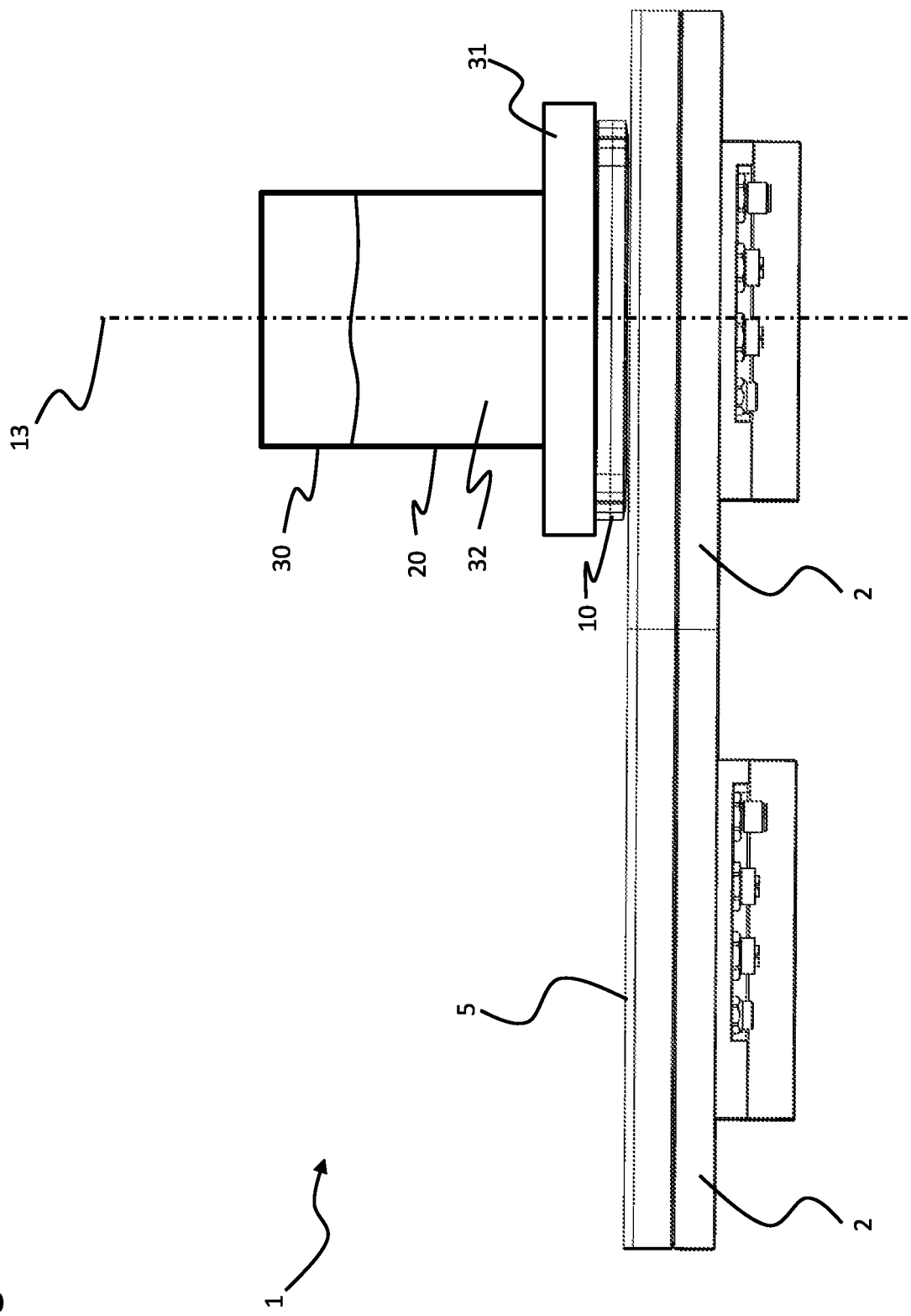
FIG. 3 shows the planar drive system of FIG. 2 in a side view.

FIG. 3 shows a side view of the planar drive system 1 prior to rotation. The rotor 10 is arranged above one of the stator modules 2 in such a way that it is in a rotational position 7. The object 20 in turn comprises a vessel 30, which is held on the rotor 10 by a vessel holder 31. A liquid 32 is disposed within the vessel 30. The rotor may further be rotated about an axis of rotation 13. In FIG. 3, however, this rotation has not yet begun.

Figure 4:
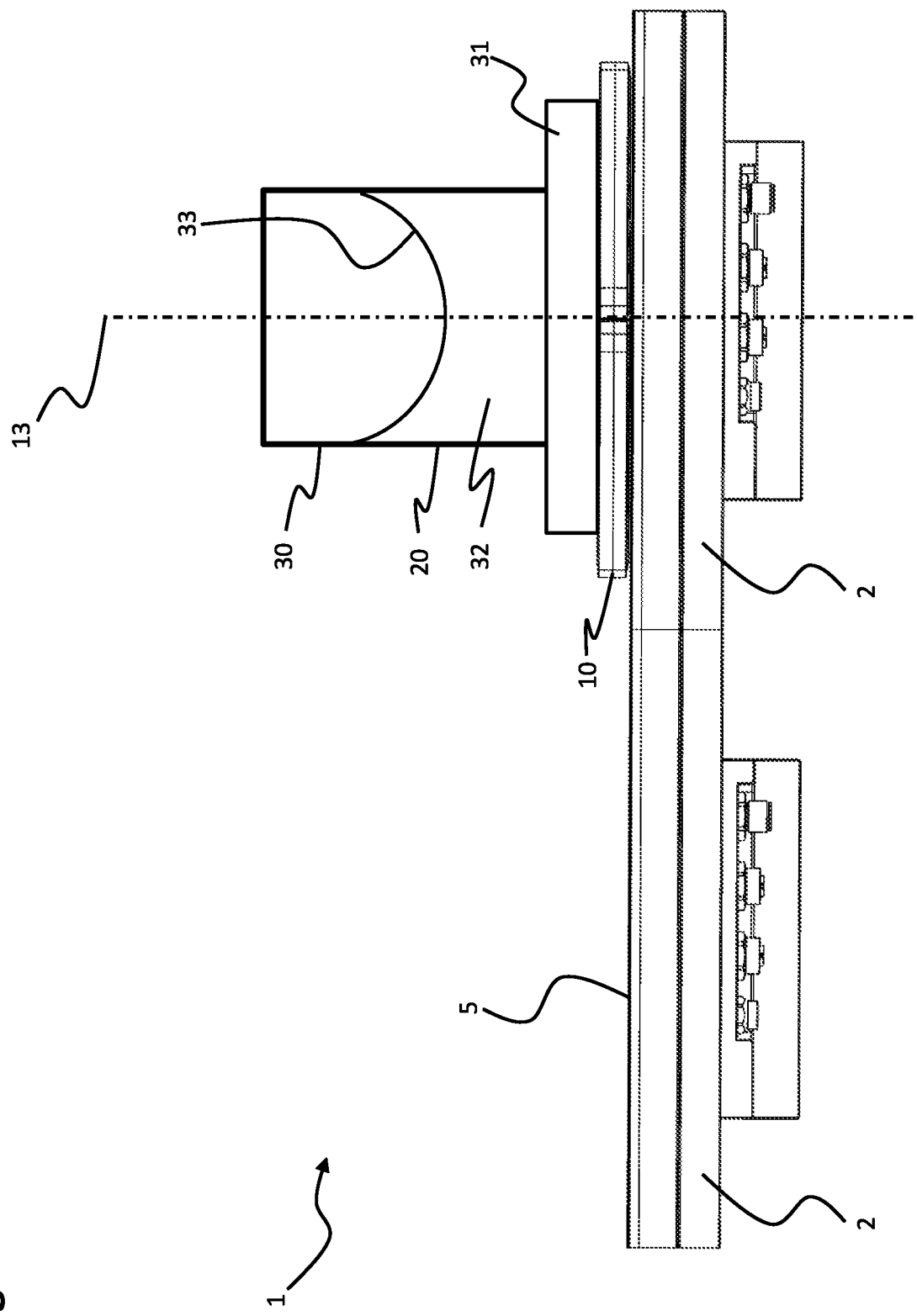
FIG. 4 shows a side view of the planar drive system of FIGS. 2 and 3 during rotation.

FIG. 4 shows the planar drive system 1 of FIGS. 2 and 3 after the rotor 10 has been set in rotation about the axis of rotation 13. Due to the centrifugal forces that now occur, the liquid 32 is no longer flat, i.e. with a surface parallel to the stator surface 5, but a curved course of the liquid surface 33 of the liquid 32 is caused. This may be used, for example, to mix the liquid 32 within the vessel. It may be provided, for example, that the liquid 32 is composed of different partial components which are successively filled into the vessel 30. With the aid of the rotation shown in FIG. 4 and the resulting curvature of the liquid surface 33 of the liquid 32, it may now be achieved that the different phases of the liquid 32 mix with one another and that a homogeneously mixed liquid 32 is provided after rotation.

Figure 5:
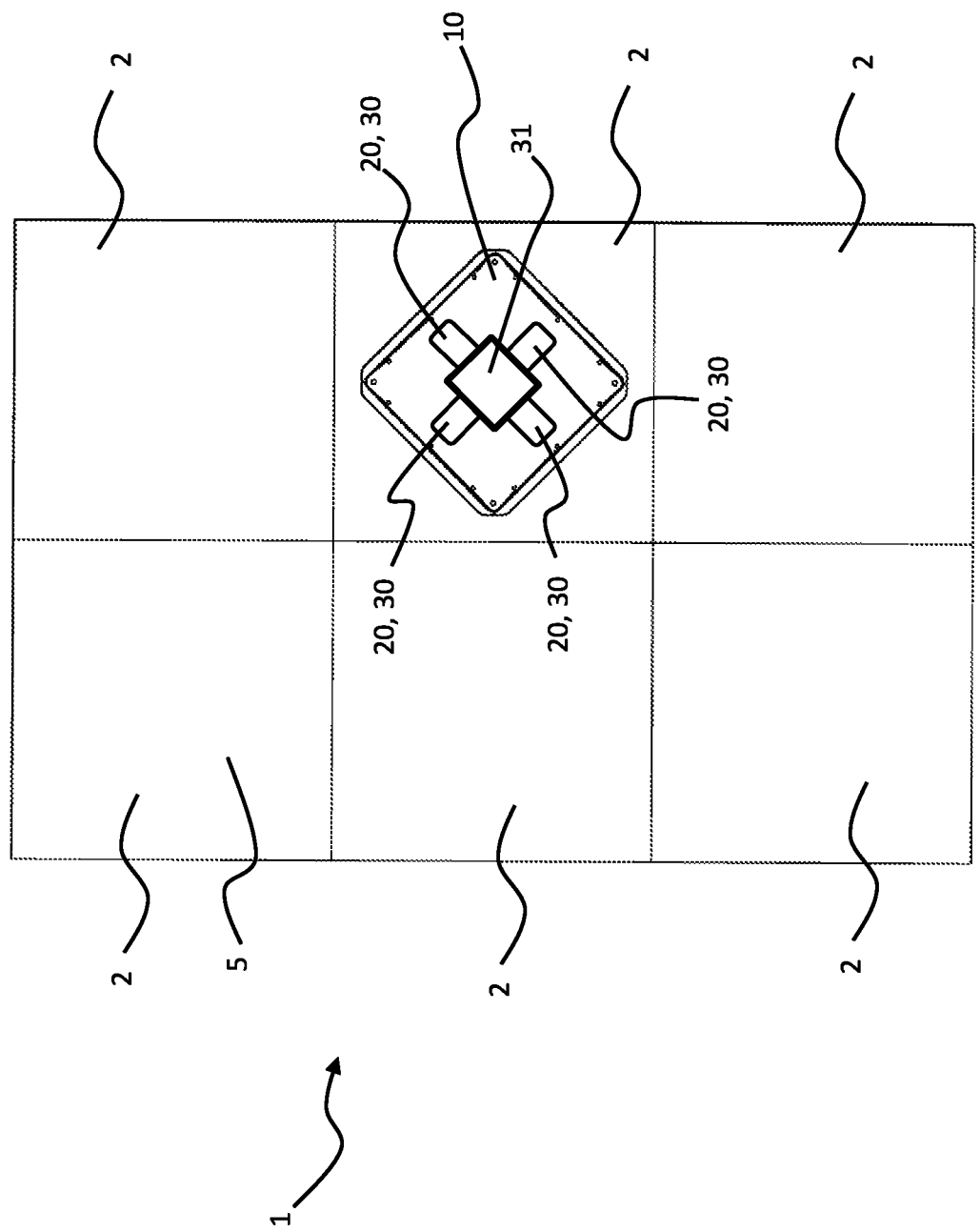
FIG. 5 shows a planar drive system having a rotor with vessel holder.

FIG. 5 shows a top view of a further planar drive system 1, wherein the vessel holder 31 in this case comprises a plurality of inserted vessels 30 and each of the vessels 30 represents an object 20 to be processed. In this regard, it is shown in FIG. 5 that the vessel holder 31 has a rectangular or square shape and that a vessel 30 is arranged on each side surface of the vessel holder 31 in a freely movable manner. If the rotor 10 is now rotated, as shown in FIG. 5, liquids may be mixed or substances separated within the vessels 30. The vessel holder 31, which is rotated with the aid of the rotor 10, may have the effect of a centrifuge.

Figure 6:
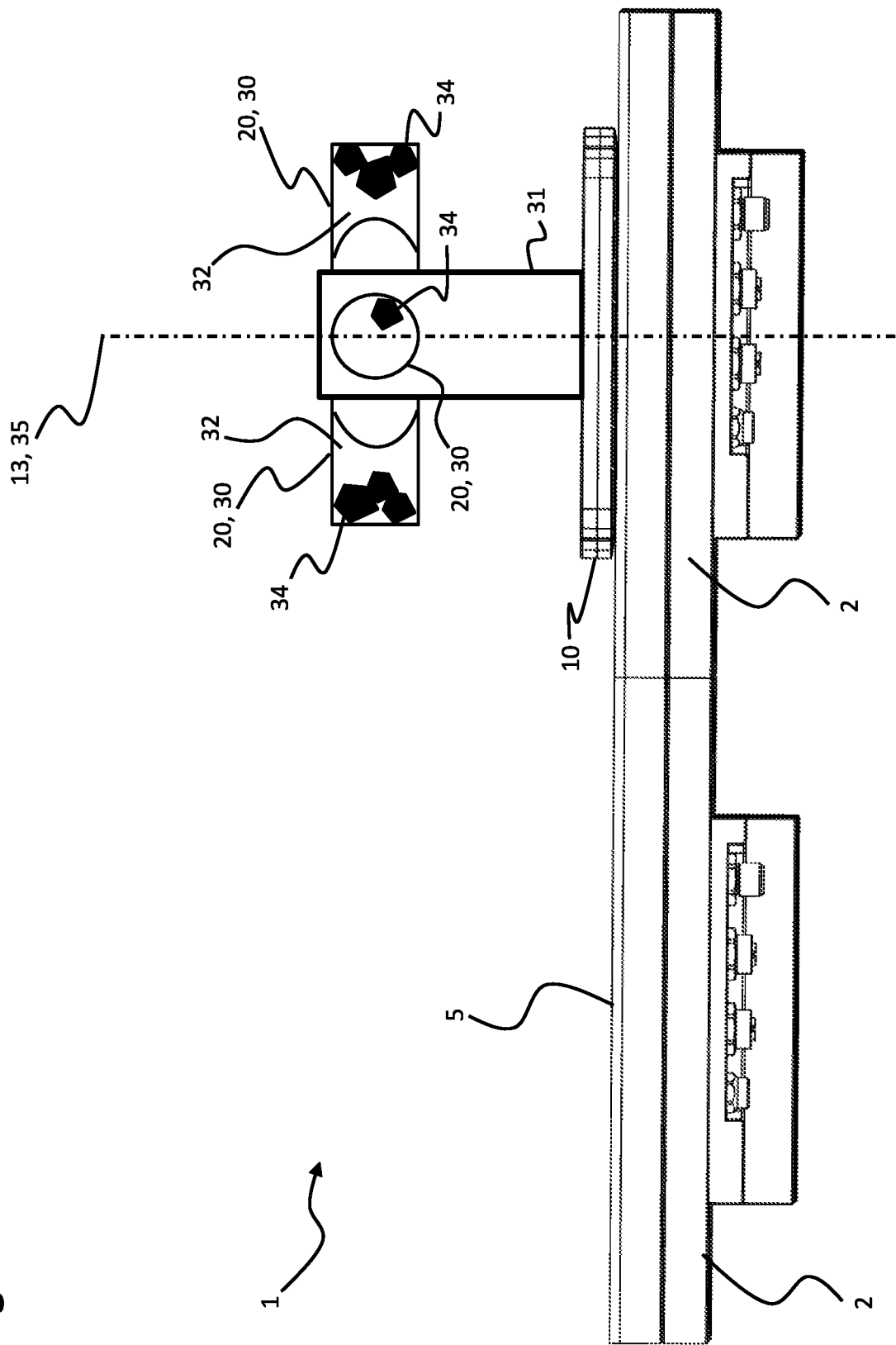
FIG. 6 shows a side view of the planar drive system of FIG. 5.

FIG. 6 shows a side view of the planar drive system 1 of FIG. 5 during rotation. Within the vessels 30, solids 34 may be disposed within a liquid 32. As a result of the rotation, the solids 34 are pressed against the outer bottom surface of the vessels 30 due to the centrifugal forces, so that solids 34 within the liquid 32 may thus be separated quite easily by the rotation. Alternatively, any other type of solids 34, for example in powdered form, may be disposed within the vessels 30. A separation of liquids 32 of different densities which are arranged in the vessels 30 is possible, as well. The vessel holder 31 with the inserted vessels is rotationally symmetrical about an axis 35, the axis 35 being guided through a center point of the rotor 10.

In the embodiment example of FIGS. 5 and 6, the vessel holder 31 is square in shape with four inserted vessels 30. However, other embodiments may also be provided, for example with more than one vessel 30 per side of the vessel holder 31 or with a round vessel holder 31 with inserted vessels 30 in each case. In an embodiment, the vessel holder 31 with the inserted vessels 30 is rotationally symmetrical about the axis 35. This is particularly advantageous because this embodiment means that the center of gravity of the vessel holder 31 with the inserted vessels 30 is guided as far as possible by the axis of rotation 13 or the axis 35, and as a result the forces acting during the rotation of the rotor 10 are as small as possible.

Figure 7:
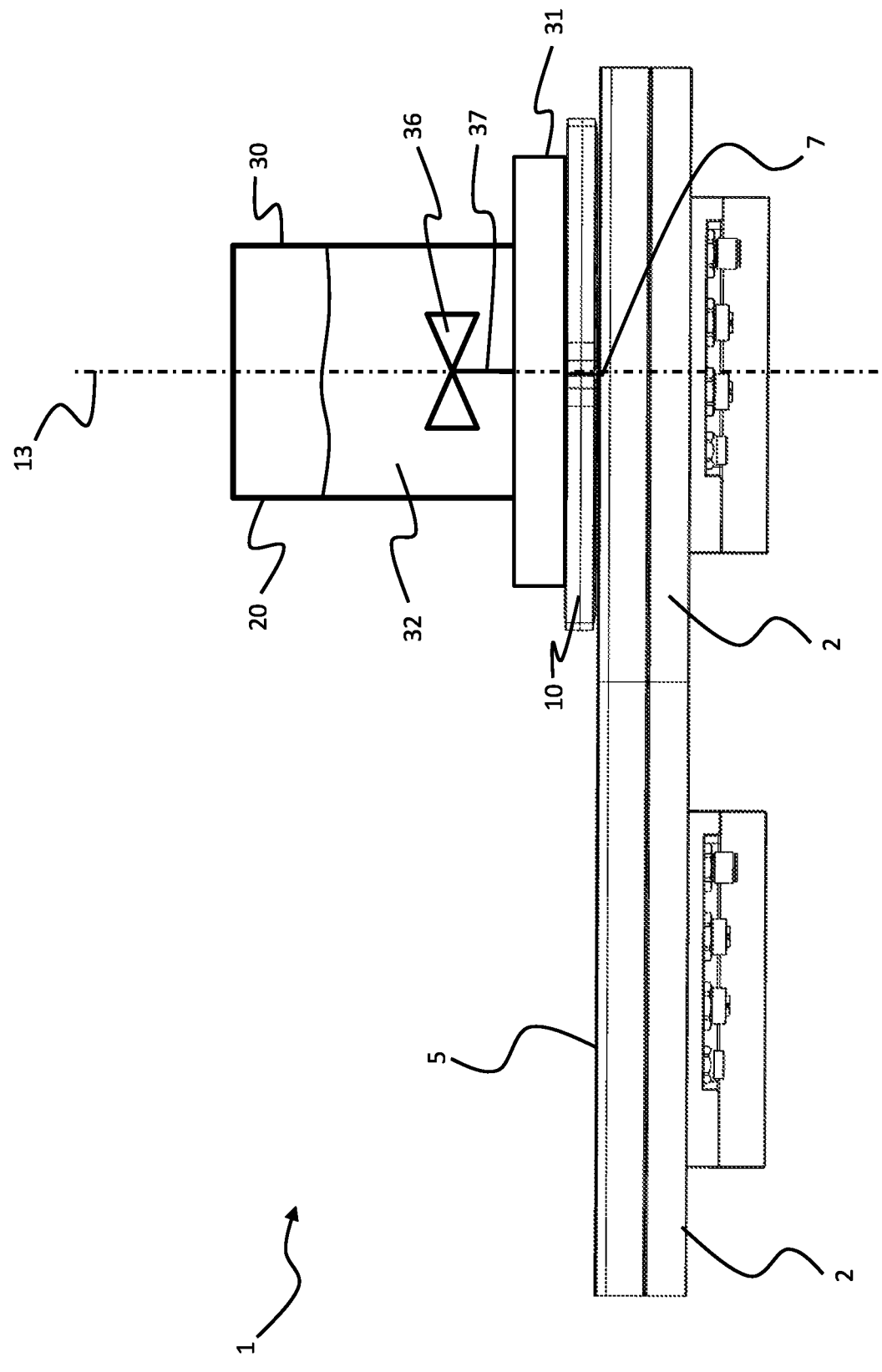
FIG. 7 shows a side view of a planar drive system with a vessel.

FIG. 7 shows a side view of a further planar drive system 1 in which the object 20 is a vessel 30 inserted in a vessel holder 31 on the rotor 10. A bucket wheel 36 is disposed within the vessel 30, with a bucket wheel rotational axis 37 being in parallel to the rotational axis 13 and guided through the rotational position 7 when the rotor 10 is disposed in the rotational position 7. A liquid 32 is further disposed within the vessel 30, covering the bucket wheel 36.

Figure 8:
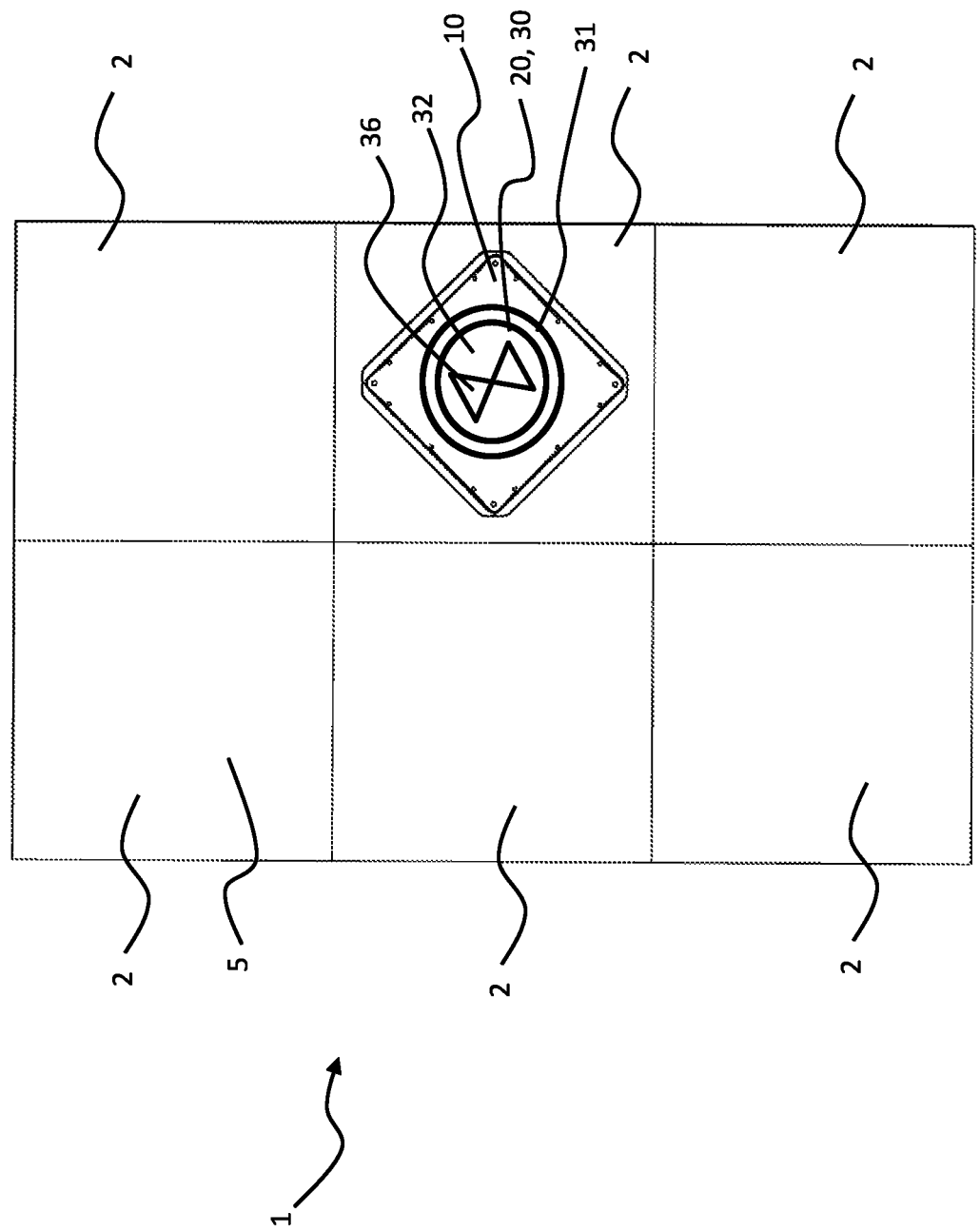
FIG. 8 shows a top view of the planar drive system of FIG. 7.

FIG. 8 shows the planar drive system 1 of FIG. 7 in a top view and in particular the vessel 32 with the bucket wheel 36 arranged within the vessel 32. In this embodiment example, it may be provided that an angular velocity of the rotor 10 is periodically increased and decreased again during the rotation, wherein the rotor 10 is initially set in rotation and the bucket wheel 36 does not yet rotate with it due to the mass inertia. As a result of the fluid 32 being set in rotation, the bucket wheel 36 is now accelerated more slowly than the rotor 10, but after a certain time reaches an angular velocity identical to that of the rotor 10. From this point on, a rotation of the rotor 10 may be reduced in its angular velocity again, wherein the mass inertia of the bucket wheel 36 initially causes the bucket wheel 36 to now rotate faster than the rotor 10. The liquid 32 rotating along with the rotor 10 and slowed down by the vessel 30 will now also slow down the movement of the bucket wheel 36 until the rotor 10 and the bucket wheel 36 rotate at an identical angular velocity again. Now an acceleration of the rotation of the rotor 10 may be carried out again, as a result of which, on the basis of the effect already described, an acceleration of the bucket wheel 36 now takes place again. This may be done until the liquid 32 is mixed as much as necessary.

Alternatively, it may be provided that the bucket wheel 36 is rigidly connected to the vessel 30. The rigidly arranged bucket wheel 36 swirls the inert fluid 32 in the vessel 30 due to a rotation of the rotor 10. Additional swirling may be created by changing the direction of rotation of the rotor 10.

Figure 9:
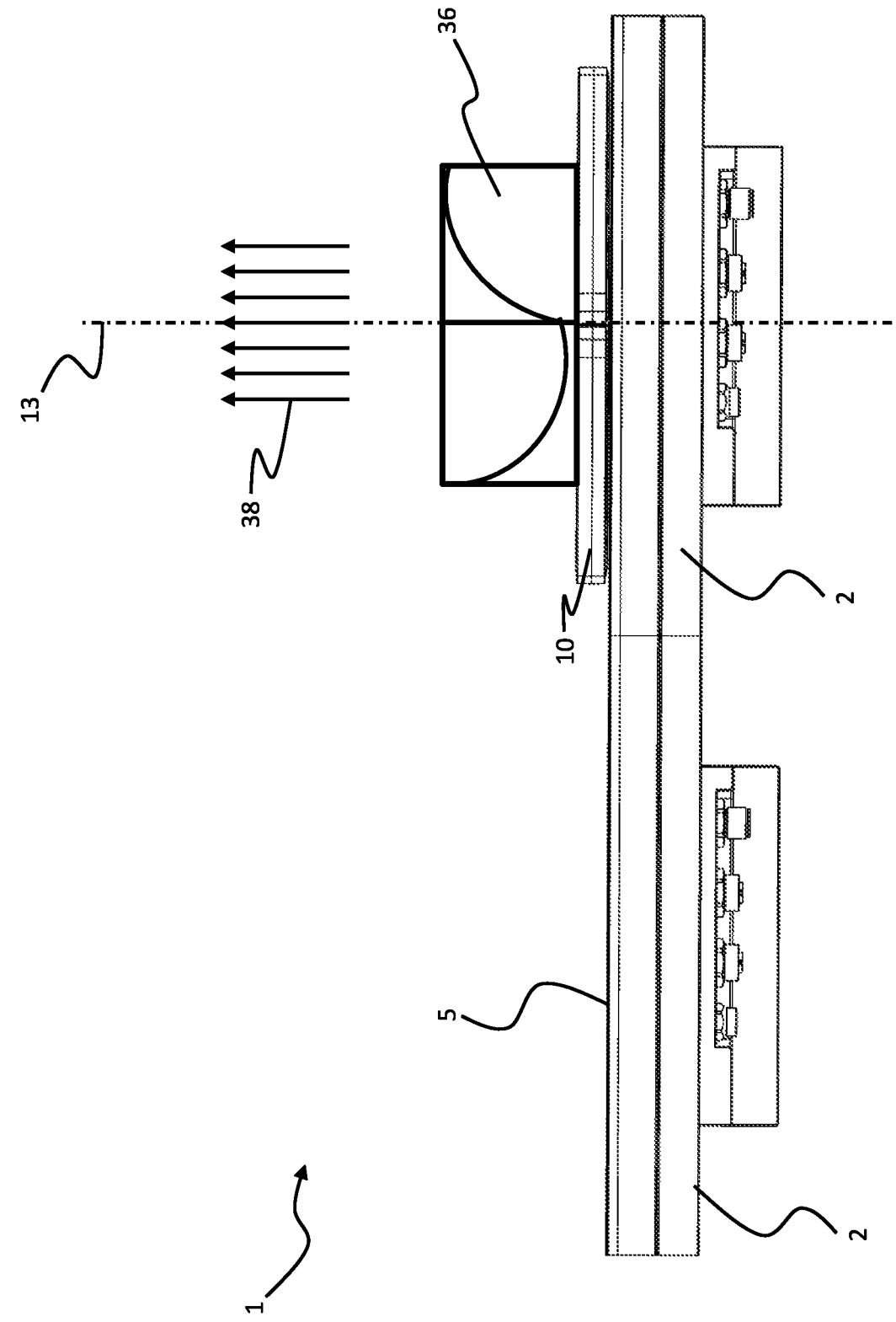
FIG. 9 shows a side view of a planar drive system having a bucket wheel.

FIG. 9 shows a side view of a planar drive system 1 in which a rotor 10 comprises a bucket wheel 36. By a rotation of the rotor 10 and a rotation of the bucket wheel 36 triggered as a result, a fluid flow 38, for example in the form of a gas or air flow, may be generated above the rotor 10. As a result of the fact that the rotor 10 may be moved to different rotational positions 7, the fluid flow 38 may be generated at different positions of the stator surface 5 of the planar drive system 1 and thus allows a flexible generation of the fluid flow 38.

In FIG. 9, the fluid flow 38 is shown above the rotor 10. However, a geometrically different embodiment of the bucket wheel 36 may also generate a fluid flow 38 which, in addition to a component perpendicular to the stator surface 5 (as shown in FIG. 9), also comprises a component parallel to the stator surface 5 or exclusively a component parallel to the stator surface 5. In the latter case, the fluid flow 38 is thus parallel to the stator surface 5.

Instead of the fluid flow 38 in the form of an air flow, another gas flow may also be generated if the rotor 10 comprising the bucket wheel 36 is not in air but in a corresponding gas.

Figure 10:
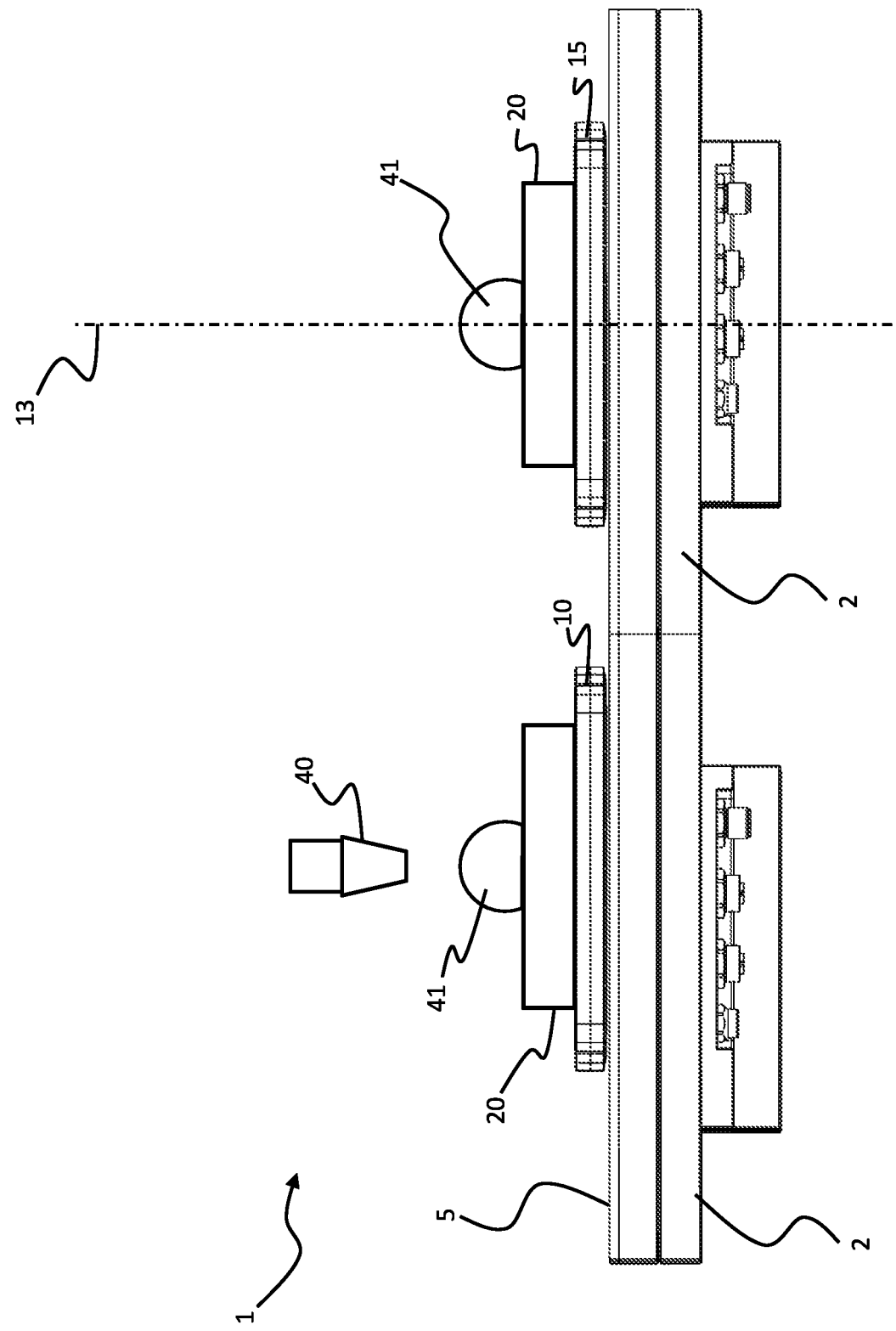
FIG. 10 shows a side view of a planar drive system prior to a spin-coating process.

FIG. 10 shows a side view of a planar drive system 1, in which a rotor 10 and a further rotor 15 are arranged above the stator surface 5 of the stator modules 2. An object 20 is arranged on each of the rotor 10 and the further rotor 15, wherein a dispensing unit 40 for a liquid droplet 41 is arranged above the rotor 10. A drop of liquid 41 is arranged on each of the two objects 20. This means that control commands were issued for the further rotor 15, which is not arranged below the dispensing unit 40, after dispensing the liquid drop 41, in such a way that the further rotor 15 moved to a different position.

Figure 11:
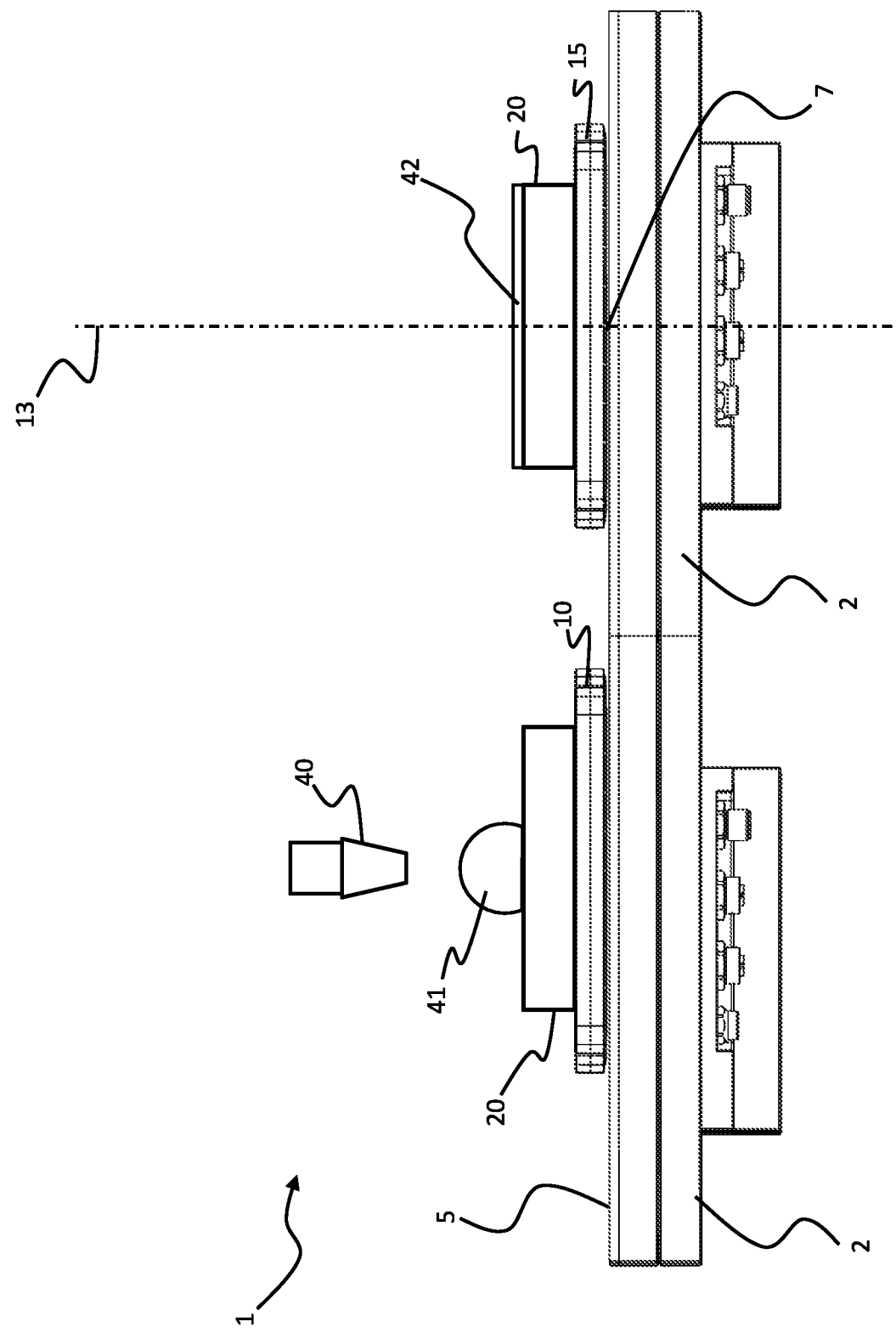
FIG. 11 shows a side view of the planar drive system of FIG. 10 during the spin-coating process.

FIG. 11 shows a side view of the planar drive system 1 of FIG. 10 after the further rotor 15 has been set in rotation. As a result of the rotation about the axis of rotation 13, the liquid droplet 41 is subjected to a centrifugal force and forms a planar spin coating layer, also referred to as spin coating layer 42, on the object 20 during the rotation.

With the aid of the described method of FIGS. 10 and 11, it is thus possible to deliver a liquid droplet 41, with the aid of which a rotational coating, i.e. a spin coating, is to be produced, onto an object 20 arranged on the rotor 10, and to achieve the spin coating with the aid of the rotor rotation, i.e. the rotation of the rotor 10 about the axis of rotation 13. This is particularly advantageous because, in addition to the task of transporting the object 20, the spin coating may also be carried out by the rotor 10 with the aid of the rotation of the rotor 10, and thus a time-consuming transfer step from the rotor 10 to a spin coating unit and back may be omitted. The object 20 may remain on the rotor 10 throughout the process, allowing for a more efficient automation system, for example in the semiconductor industry.

Figure 12:
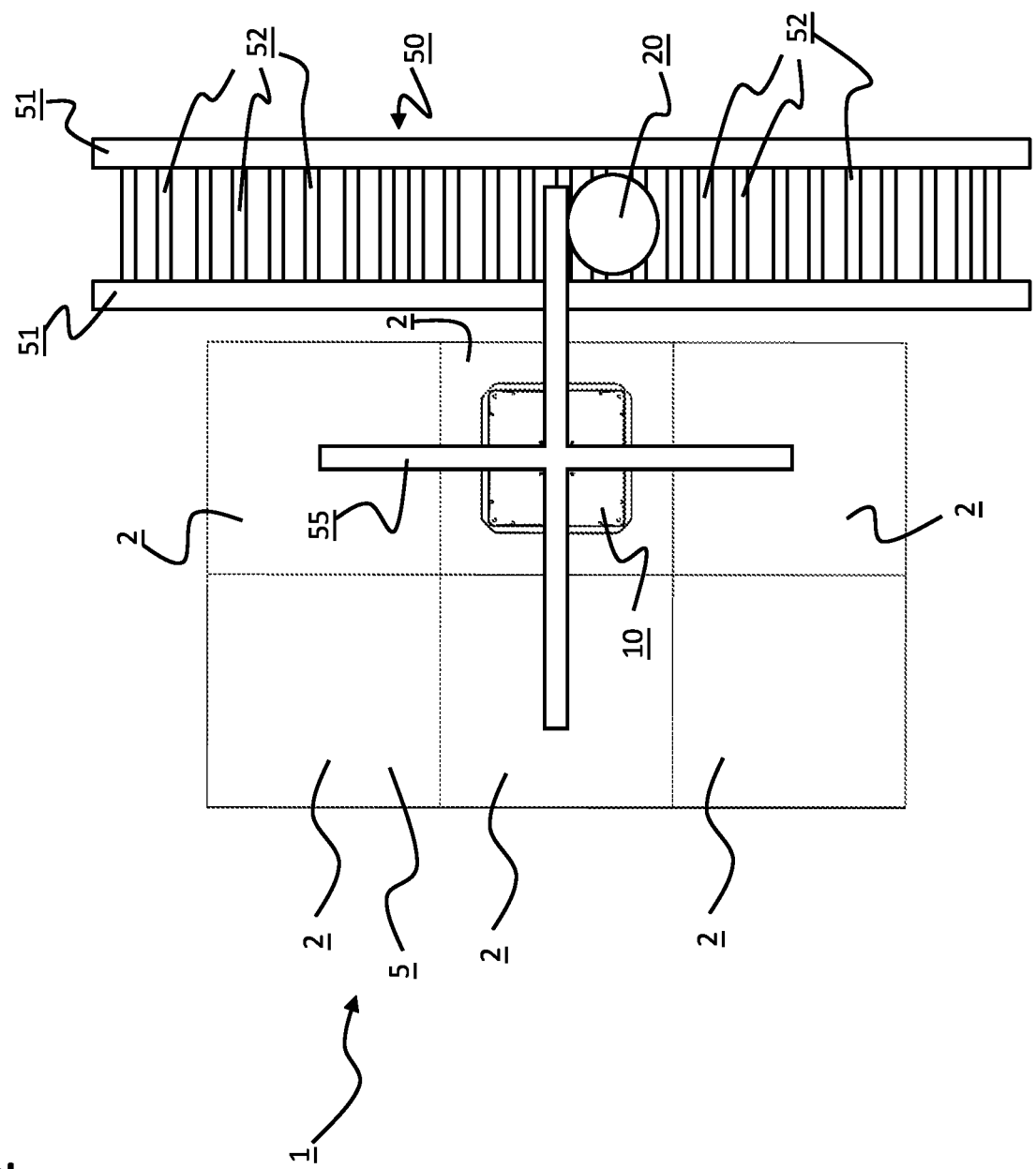
FIG. 12 shows a planar drive system having a turnstile on a rotor.

FIG. 12 shows a top view of a planar drive system 1 in which six stator modules 2 form a stator surface 5. A roller track 50 with two rails 51 and rollers 52 arranged between the rails 51 is arranged next to the stator modules 2. An object 20 may be moved along the roller track 50. A rotor 10 of the planar drive system 1 has a turnstile 55, the turnstile 55 projecting beyond the rotor 10 and in particular being arranged at least partially above the roller track 50. An object 20 moving on the roller track 50 may be stopped by the turnstile 55 and prevented from moving further. The rotor 10 is in this context arranged in a rotational position of the planar drive system 1.

Figure 13:
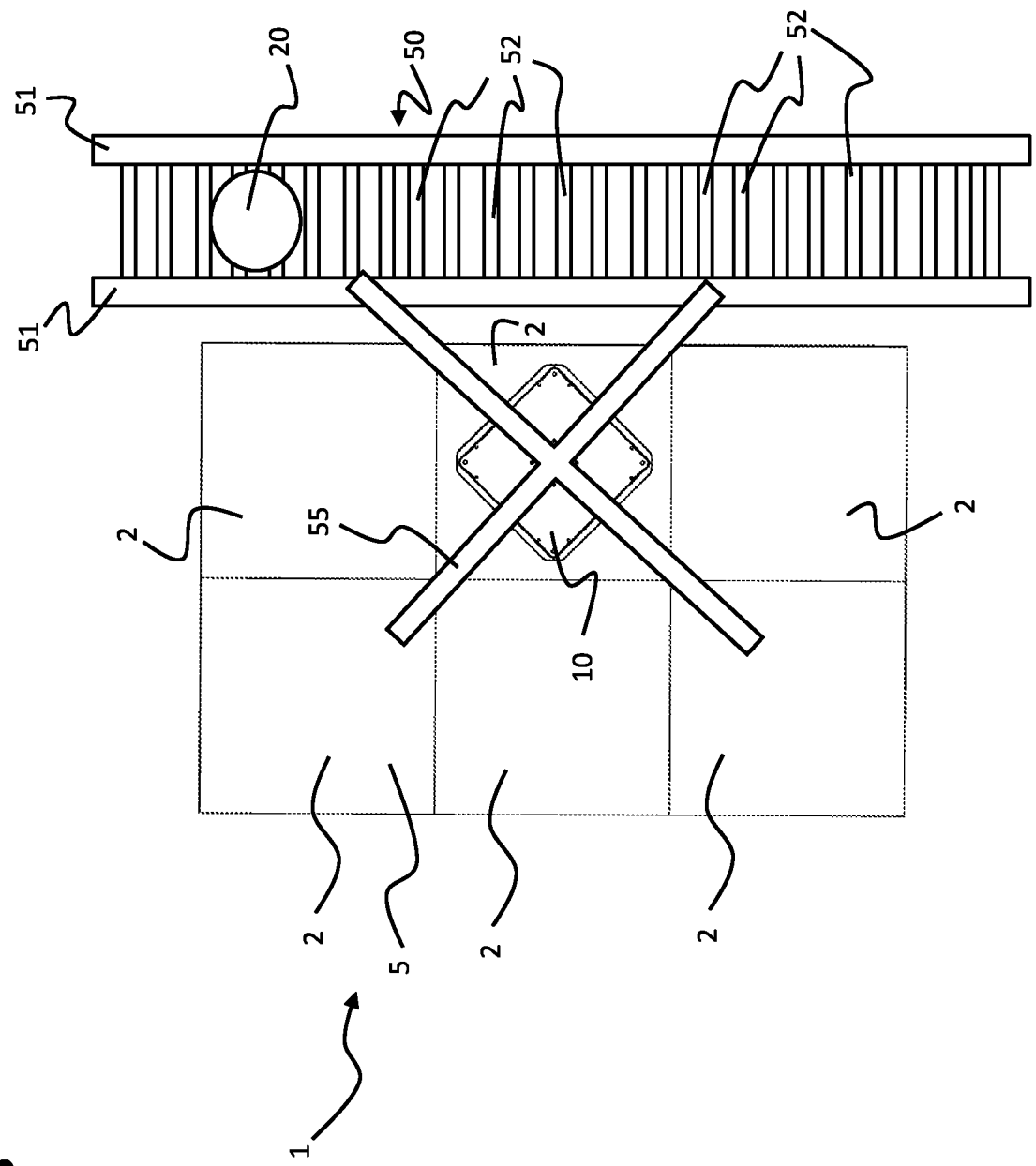
FIG. 13 shows the planar drive system of FIG. 12 when passing an object.

FIG. 13 shows the planar drive system 1 of FIG. 12 after the rotor 10 has rotated by 45°. The object 20 may continue to move on the roller track 50, since the turnstile 55 no longer restricts the movement of the object 20.

Figure 14:
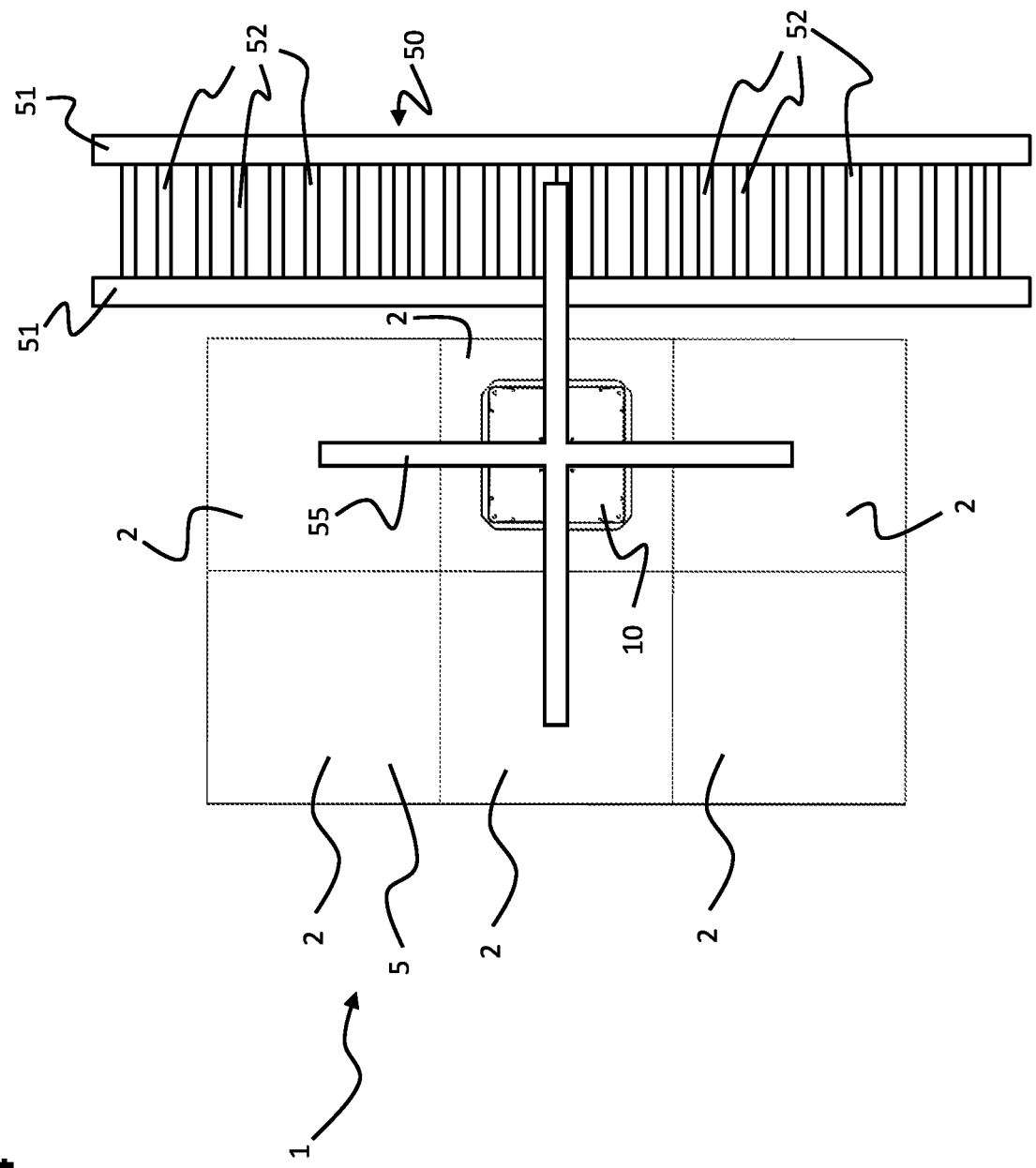
FIG. 14 shows the planar drive system of FIGS. 12 and 13 after passing an object.

FIG. 14 shows the planar drive system 1 of FIGS. 12 and 13, after the rotor 10 has rotated a further 45° compared to FIG. 13 and thus a total of 90° compared to FIG. 12. The turnstile 55 is now again arranged above the roller track 50 and may influence a further object.

In the embodiment example of FIGS. 12 to 14, it may be provided that other objects, in particular different objects, are moved on the roller track 50, as well. In this context, it may also be provided that different objects require different turnstiles 55 and further rotors 10 having further turnstiles 55 are arranged in the planar drive system 1 and are moved into the rotational position depending on the object 20 moved on the roller track 50. Instead of the roller track 50, another means of transport, such as a conveyor belt or another movement path, may also be provided.

Thus, in the embodiment example of FIGS. 12 to 14, the object 20 is influenced with the aid of the turnstile 55 projecting beyond the rotor 10. In particular, it may be provided that the turnstile 55 influences an object flow. In this context, in a preferred embodiment example, it may be provided that the turnstile 55 influences objects 20 of the object stream with respect to an object distance. The rotor 10 with the turnstile 55 may move in parallel to the roller track 50 and may thus be used as a turnstile 55 at various points on the roller track 50.

Figure 15:
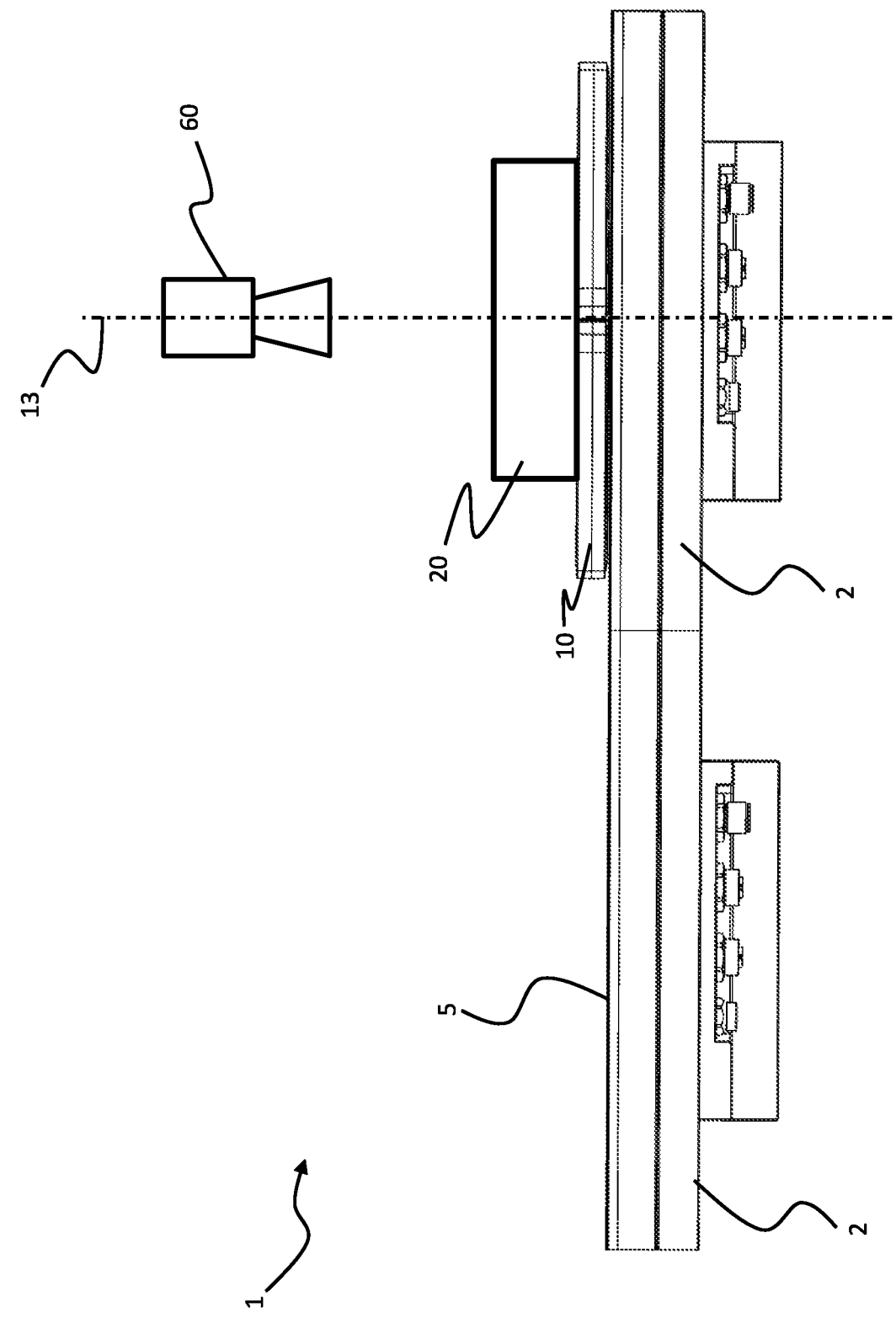
FIG. 15 shows a planar drive system comprising a camera.

FIG. 15 shows a side view of a planar drive system 1 in which a camera 60 is mounted above a rotor 10 on which an object 20 is arranged. With the aid of the camera 60, an alignment of the object arranged on the rotor 10 may be determined and an arbitrary alignment of the object 20 may be achieved by rotating the rotor 10. This is particularly advantageous if the object 20 may be arranged on the rotor 10 in four different alignments, and a predetermined alignment is selected with the aid of a rotation of the rotor 10 based on an image from the camera 60. This in turn allows for a more flexible use of the planar drive system 1 in automation technology.

Instead of or in addition to the camera 60, a barcode reader may be arranged, wherein a reading of the barcode is possible with the aid of the rotation of the rotor 10. In particular, the camera 60 may be set up to read the barcode.

Figure 16:
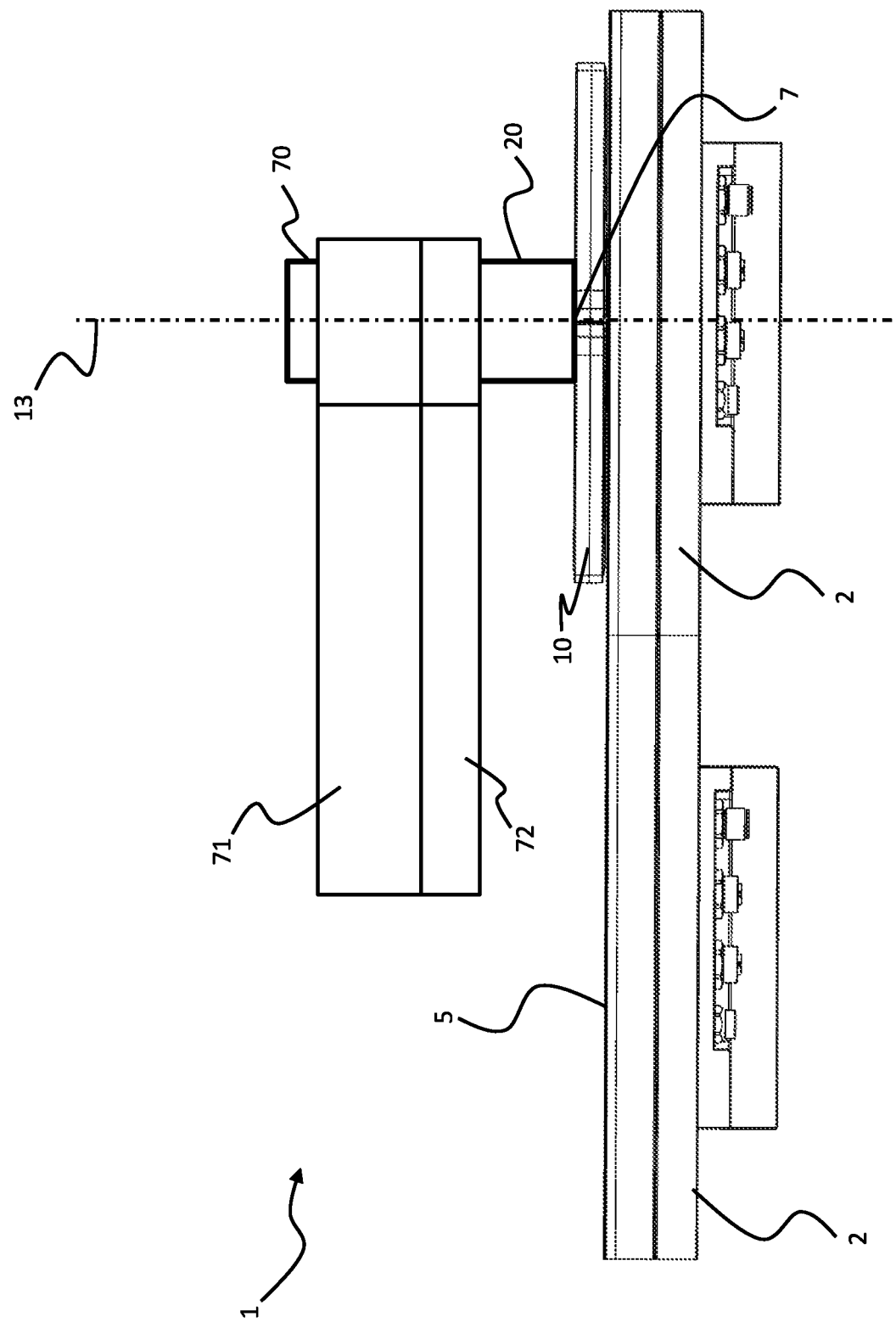
FIG. 16 shows a planar drive system for winding or unwinding an object.

FIG. 16 shows a side view of a planar drive system 1 in which an object 20, configured as a coil 70, is arranged on a rotor 10. The rotor 10 may be rotated in a rotational position 7. A first winding material 71 and a second winding material 72 may be wound or unwound on the coil 70 with the aid of a rotation of the rotor 10. It may be provided to dynamically adjust a speed of the rotation, since a diameter is larger or smaller depending on the amount of the wound first winding material 71 or second winding material 72, respectively, and thus, for example, if a constant speed of the first winding material 71 and second winding material 72, respectively, is to be maintained, different speeds of rotation are necessary. Furthermore, the rotor 10 may be moved perpendicular to the stator surface 5 in order to carry out a position correction. Moreover, the rotor 5 may be tilted to carry out a position correction.

In this context, the first winding material 71 or the second winding material 72, respectively, may be provided outside of the planar drive system 1 on rotatably supported coils or may be wound on driven coils. It is also possible to provide only the first winding material 71 or further winding materials. Furthermore, with the aid of a suitable device, the orientation of the first winding material 71 with regard to the second winding material 72 may be varied in such a way that, contrary to the embodiment shown, the first winding material 71 is oriented in the direction of the stator surface 5 and the second winding material 72 is oriented away from the stator surface 5. Also, this process may be carried out continuously so that the first winding material 71 and the second winding material 72 are practically interwoven on the coil 70.

Figure 17:
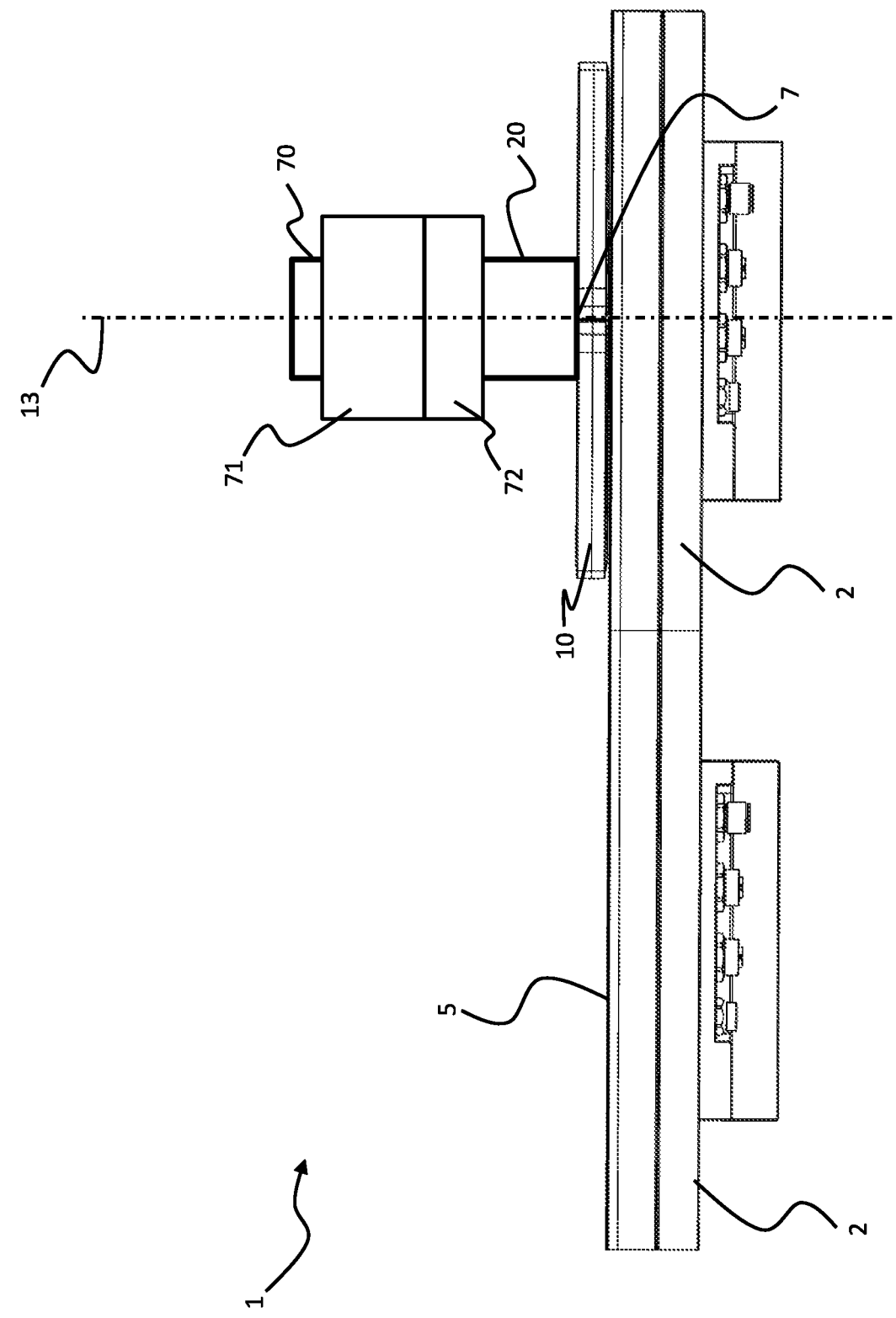
FIG. 17 shows the planar drive system of FIG. 16 with wound material.

FIG. 17 shows the planar drive system 1 of FIG. 16, in which the first winding material 71 and the second winding material 72 are fully wound onto the coil 72.

Figure 18:
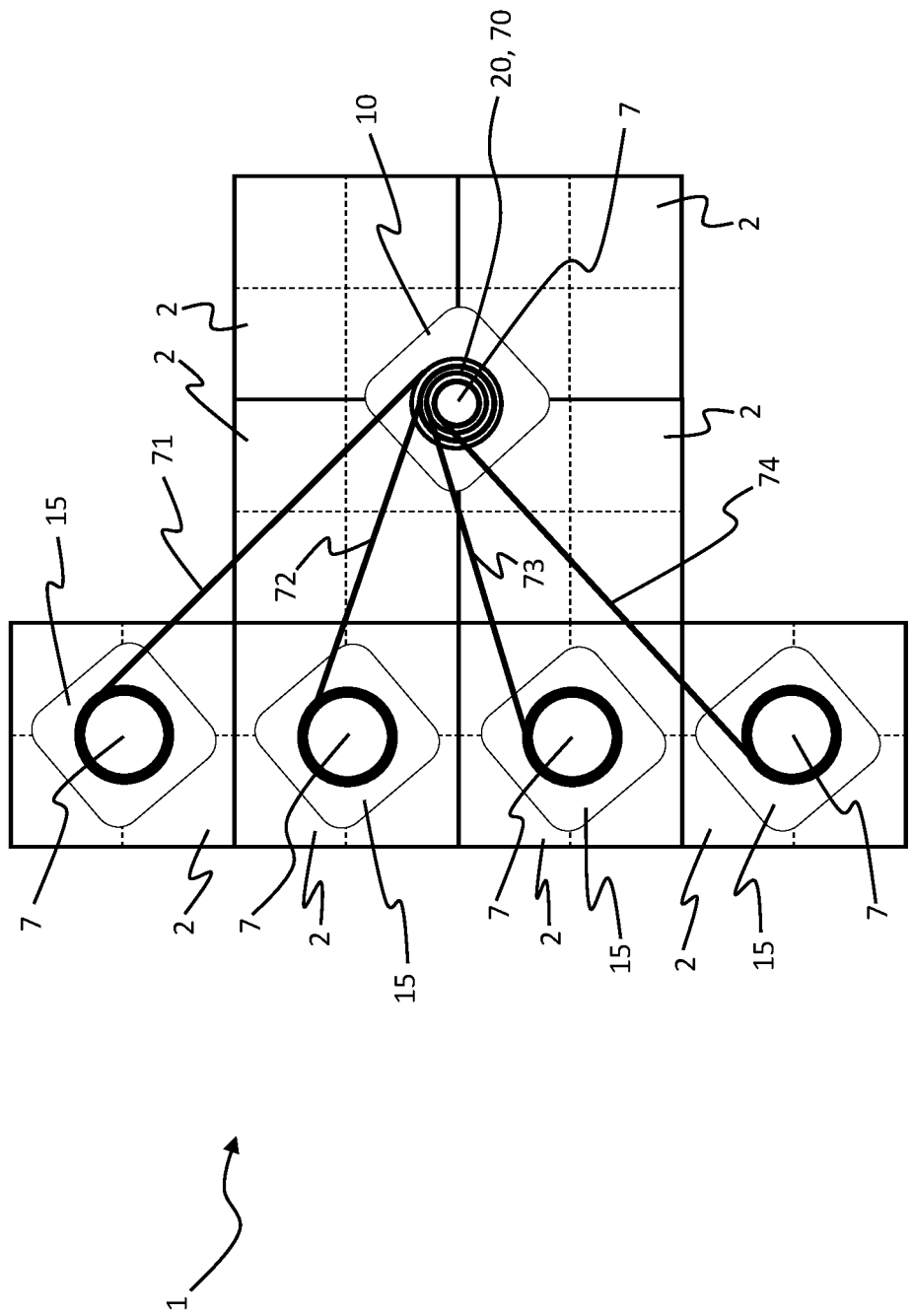
FIG. 18 shows a planar drive system for winding and unwinding between rotors.

FIG. 18 shows a top view of a planar drive system 1 in which an object 20, also embodied as a coil 70, is arranged on a rotor 10. Furthermore, the planar drive system 1 comprises four further rotors 15. The rotor 10 and the further rotors 15 are each arranged in a rotational position. The further rotors 15 each provide winding material, each further rotor 15 providing a winding material. A first winding material 71, a second winding material 72, a third winding material 73 and a fourth winding material 74 are unwound from the further rotors 15 and delivered to the rotors 10, where they are wound onto the coil 70. The speed of rotation of the rotor 10 and of the further rotors 15 may in turn be dynamically adjusted. This results in a multilayer winding material.

Figure 19:
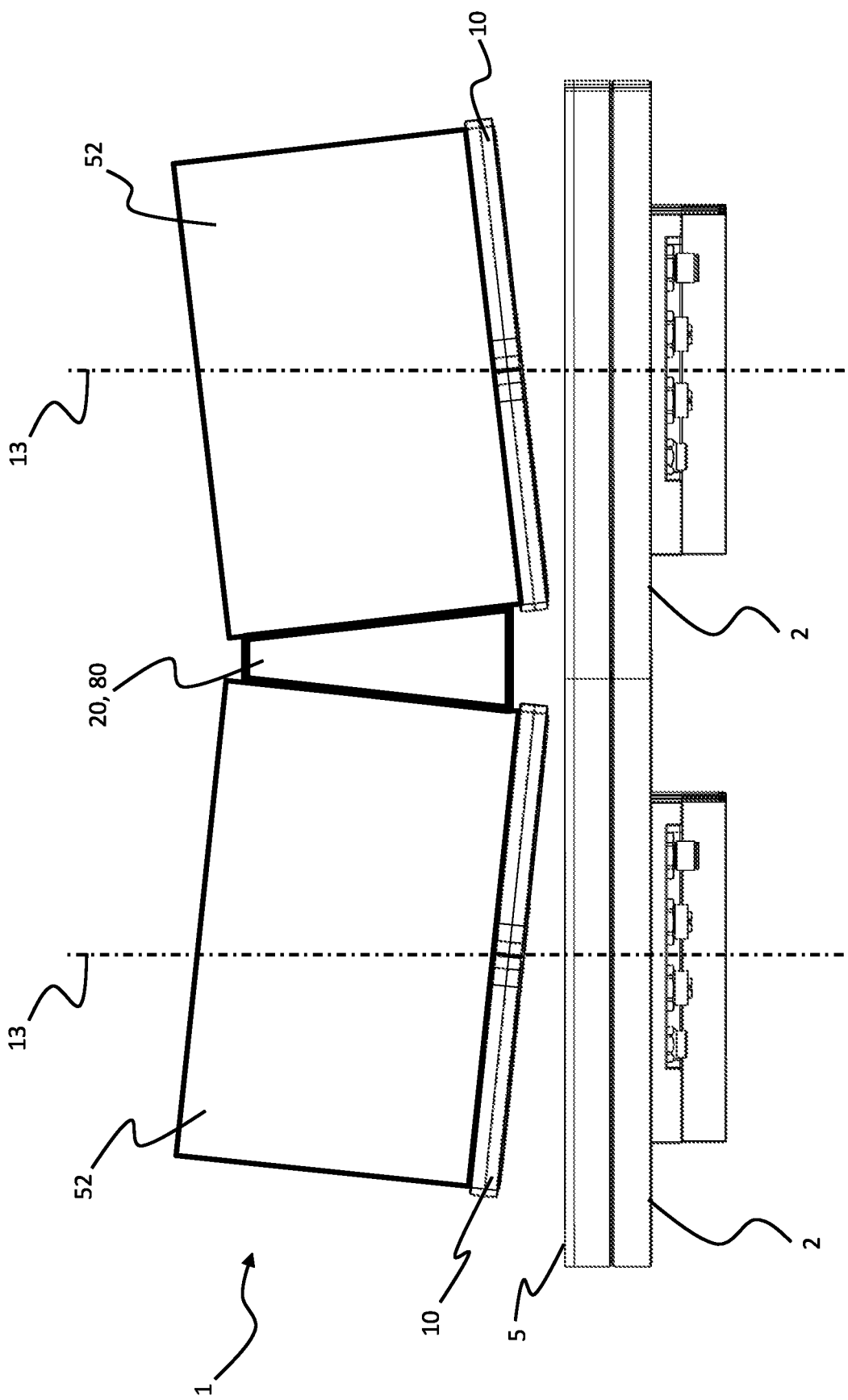
FIG. 19 shows a planar drive system for belt transport.

FIG. 19 shows a cross-section of a planar drive system 1 in which an object 20, embodied as a ribbon 80, may be moved with the aid of rollers 52 arranged on rotors 10. The ribbon 80 may be moved by a plurality of such rotors 10 with rollers 52. The ribbon 80 shown in FIG. 19 is embodied in such a way that the rollers 52 are not perpendicular to the stator surface 5 during rotation of the rotors 10, but are slightly tilted. This slight tilting is achieved by tilting the rotors 10. Even in the tilted alignment of the rotors 10, they may be rotated about the axis of rotation 13 as described. Of course, it is also possible for the rollers 52 to be perpendicular to the stator surface 5.

Figure 20:
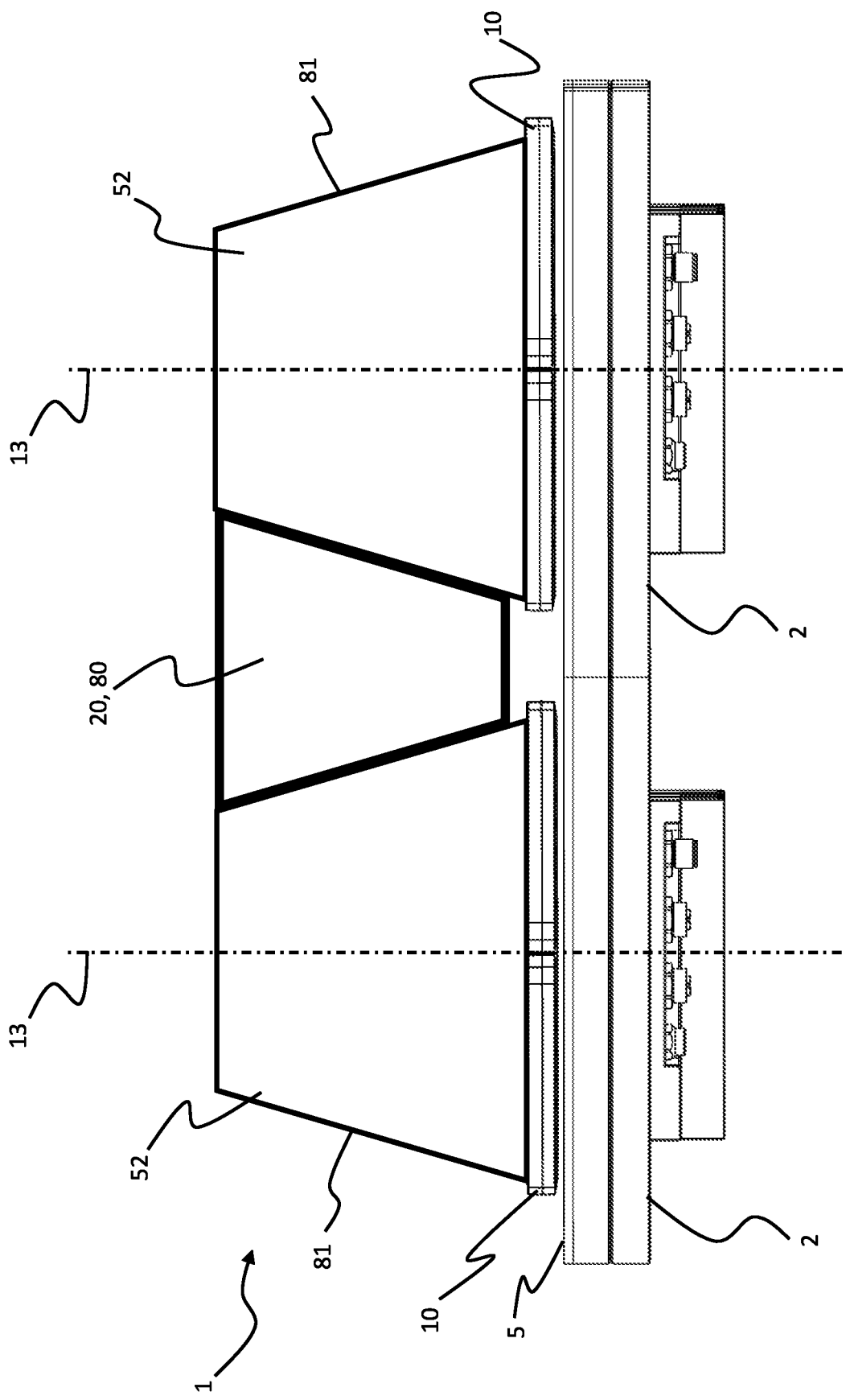
FIG. 20 shows a further planar drive system for belt transport.

FIG. 20 shows a further cross-section through a planar drive system 1, in which an object 20, embodied as a ribbon 80, may be moved with the aid of rollers 52 arranged on rotors 10. The rollers 52 are embodied as conical rollers 81 and compensate for the shape of the ribbon 80 so that the conical rollers 81 may stand vertically.

Figure 21:
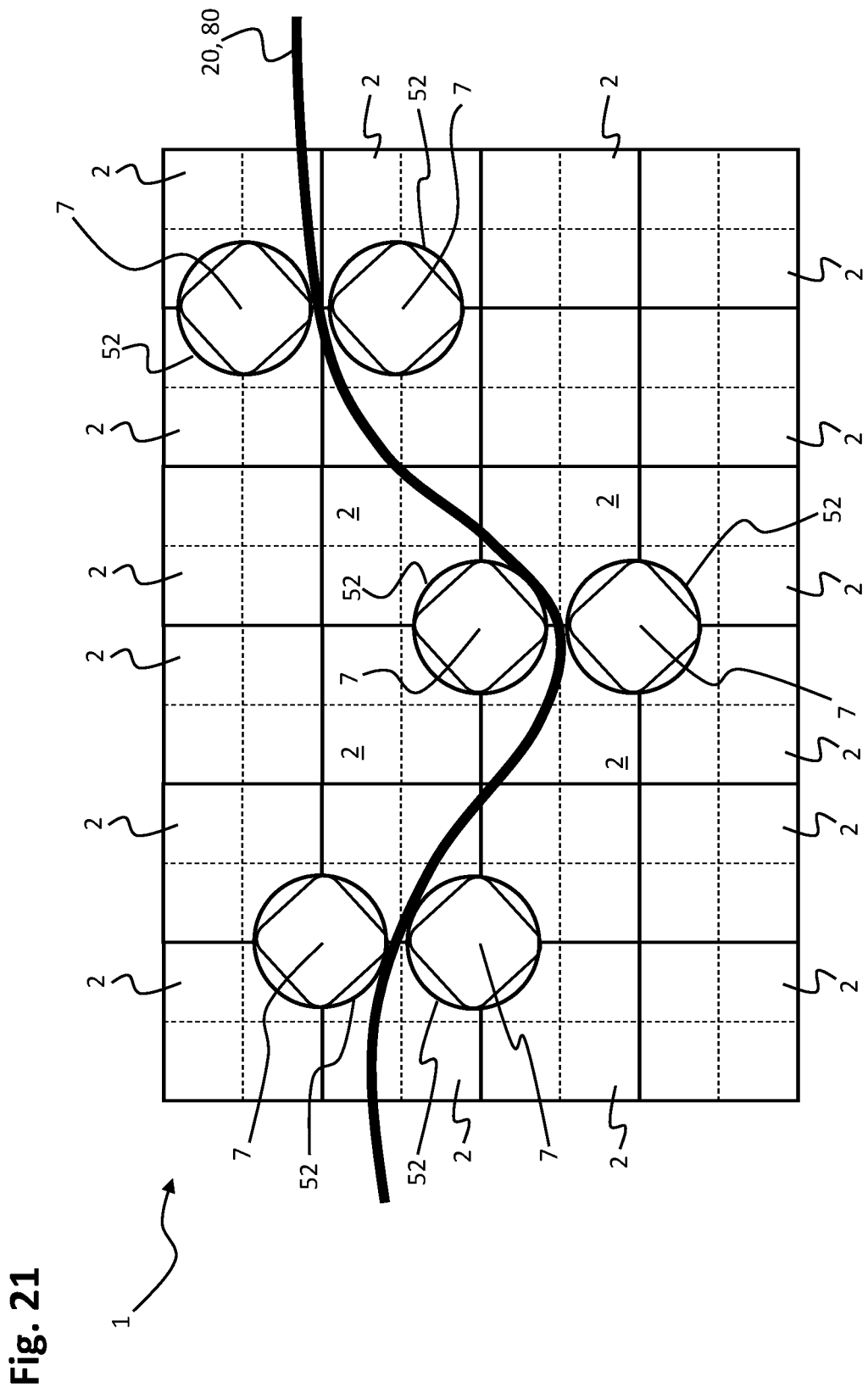
FIG. 21 shows a further planar drive system for belt transport.

FIG. 21 shows a top view of a planar drive system 1, which may be configured as shown in FIG. 19 or 20. The object 20, in this case the ribbon 80, is guided by a plurality of pairs of rollers 52, the rollers 52 each being arranged on a rotor 10 and thereby being rotatable. Thus, the ribbon 80 may be transported by rotating the rotors 10 of each pair of rollers 52 in opposite directions. The ribbon 80 may thus be guided, deflected or transported. Deflection or guiding positions may be selected according to the available rotational positions 7. With the aid of synchronized rotation of the rotors 10, a tension may be generated on a material of the ribbon. Tilting of the rotors 10 during rotation may be used to compress the top or bottom of the ribbon.

FIG. 22 shows a top view of a further planar drive system 1 in which a rotation of a rotor 10 may be used to drive a rotary disk in the form of a second gear wheel 94. For this purpose, the rotor 10 comprises a first gear wheel 90 which is fixedly connected to the rotor 10 and which is connected to the second gear wheel 94 with the aid of a chain 91. The second gear wheel 94 is in this context arranged outside of the stator surface 5. If the rotor 10 is rotated, the rotary movement may be transmitted to the second gear wheel 92 with the aid of the chain 91.

Figure 23:
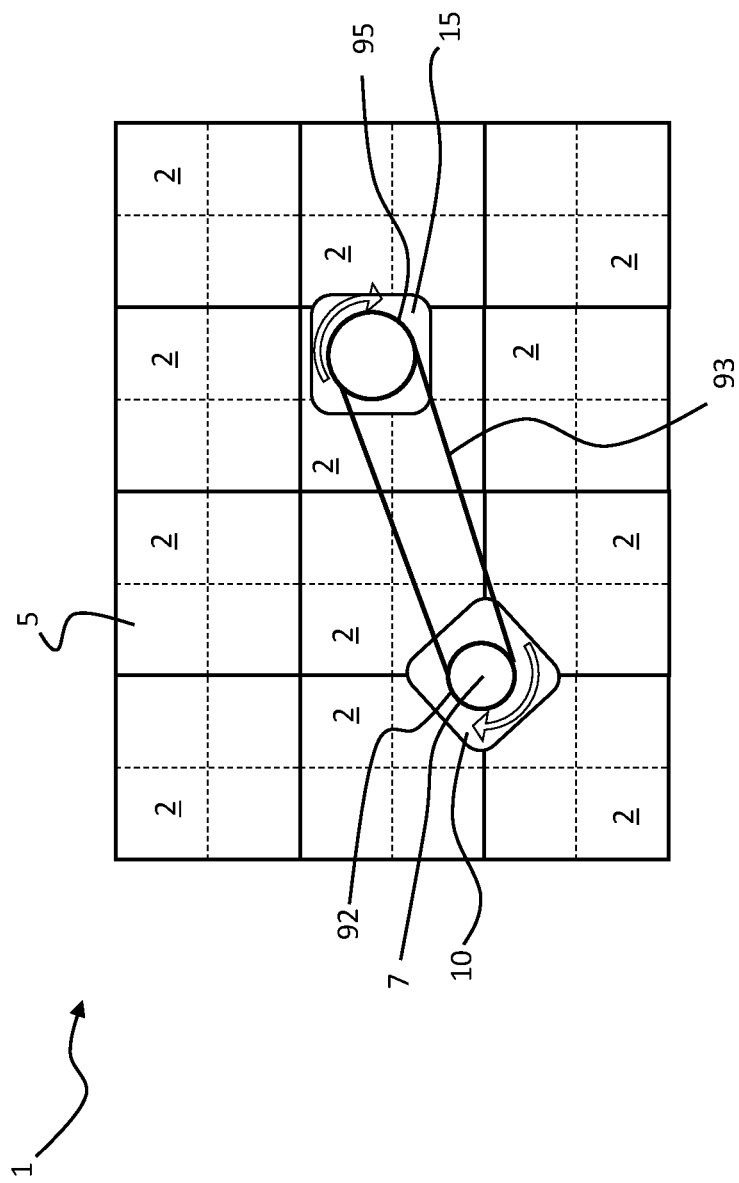
FIG. 23 shows a further planar drive system for transmitting rotary motion.

FIG. 23 shows a top view of a further planar drive system 1, in which a rotation of a rotor 10 may also be used to drive a rotating disk, in this case in the form of a second belt pulley 95. The second belt pulley 92 is arranged on a further rotor 15 and is connected with the aid of a belt 93, for example a V-belt or toothed belt, to a first belt pulley 92 fixedly arranged on the rotor 10. In this way, the rotating disk in the form of the second pulley 95 may be driven, as well. Since the further rotor 15 is not bound to a rotational position 7, more flexible rotational movements at different positions of the planar drive system 1 are thus possible.

Instead of the drives with the aid of chain 91 and belt 93, other types of drives may also be used in the embodiment examples of FIGS. 22 and 23, such as rope drives. Furthermore, a belt 93 may also be used in the embodiment example of FIG. 22 and a chain 91 in the embodiment example of FIG. 23.

The controller 9 of FIG. 1 may respectively comprise a computing unit and be set up to output control signals, the control signals being able to comprise energization information for the coil groups 4 of the stator assemblies 3. The coil groups 4 may then be energized on the basis of the control signals in such a way that the movements of the rotors 10 shown in FIGS. 2 to 23 are executed. The planar drive system 1 may respectively include the controller 9, the rotor 10, and the stator modules 2 as described.

What is claimed is:

1. A planar drive system, comprising:
at least one stator assembly each comprising a plurality of coil groups for generating a stator magnetic field, and a stator surface;
further comprising at least one rotor having a plurality of magnet units for generating a rotor magnetic field, wherein the rotor is drivable above the stator surface with aid of a magnetic coupling between the stator magnetic field and the rotor magnetic field,
wherein the planar drive system further comprises a controller,
wherein the controller is configured to output control commands to the stator assemblies of the planar drive system to energize the coil groups in such a way that the rotor moves to a rotational position and then rotates, and
wherein an object positioned on the rotor is processed with aid of rotation of the rotor, the object comprising a plurality of vessels inserted into a vessel holder of the rotor, wherein the vessel holder with the inserted vessels is rotationally symmetrical about an axis, wherein the axis is directed through a center of the rotor.

2. The planar drive system according to claim 1, wherein the planar drive system comprises at least one stator module, wherein at least one stator assembly is arranged within the stator module.

3. The planar drive system according to claim 2, wherein four stator assemblies are arranged in each stator module, wherein the stator assemblies have a square arrangement, wherein the stator module comprises a square top surface, wherein the square top surface is part of the stator surface, wherein the rotational position is arranged in the center of a stator module of the at least one stator module and/or in the center of an outer edge of said stator module.

4. A method for processing an object with a planar drive system according to claim 1,
wherein in the rotational position the rotor is rotatable about a rotational axis perpendicular to the stator surface, and
the method comprising the following steps:
energizing the coil groups in such a way that the rotor moves to the rotational position;
energizing the coil groups in such a way that the rotor rotates; and
processing the object with aid of the rotation of the rotor,
wherein the object comprises a plurality of vessels inserted into a vessel holder of the rotor, wherein the vessel holder with the inserted vessels is rotationally symmetrical about an axis, wherein the axis is directed through a center of the rotor.

5. The method according to claim 4, wherein a liquid is mixed or substances are separated by the rotation of the rotor, with the vessel holder.

6. A planar drive system, comprising:
at least one stator assembly each comprising a plurality of coil groups for generating a stator magnetic field, and a stator surface,
further comprising at least one rotor having a plurality of magnet units for generating a rotor magnetic field, wherein the at least one rotor is drivable above the stator surface with aid of a magnetic coupling between the stator magnetic field and the rotor magnetic field,
wherein the planar drive system further comprises a controller,
wherein the controller is configured to output control commands to the stator assemblies of the planar drive system to energize the coil groups in such a way that the rotor rotates,
wherein the rotor comprises a bucket wheel rotatably mounted within a vessel, wherein a bucket wheel rotational axis of the bucket wheel is parallel to a rotor rotational axis of the rotor and is defined by a rotational position of the rotor when the rotor is arranged in the rotational position,
wherein rotation of the rotor with the bucket wheel causes a fluid flow of fluid disposed within the vessel.

7. A method for processing an object with a planar drive system according to claim 6, wherein the rotor comprises said bucket wheel rotatably mounted within said vessel, and wherein in the rotational position the rotor is rotatable about the rotor rotational axis perpendicular to the stator surface;

the method comprising the following steps:

energizing the coil groups in such a way that the rotor moves to the rotational position;

energizing the coil groups in such a way that the rotor rotates; and processing the object with aid of the rotation of the rotor;

wherein the object is a vessel inserted into a vessel holder of the rotor, and wherein said bucket wheel rotational axis is parallel to said rotor rotational axis and defined by the rotational position of the rotor, wherein said rotation of the rotor with the bucket wheel causes said fluid flow.

8. The method according to claim 7, wherein a drive of the bucket wheel is carried out by varying a rotational speed of the rotor and, due to inertia, the bucket wheel has at least at sometimes a different rotational speed than the vessel arranged on the rotor.

9. The method according to claim 8, wherein at first the rotor is accelerated and the bucket wheel rotates slower than the rotor until the inertia is overcome and the bucket wheel rotates at an angular velocity equal to that of the rotor, wherein subsequently the angular velocity of the rotor is reduced, wherein, due to inertia, the bucket wheel at first continues to rotate faster than the rotor until the angular velocity of the bucket wheel has adjusted to that of the vessel, wherein subsequently the angular velocity of the rotor is increased again and the bucket wheel again rotates slower than the vessel until the angular velocity of the bucket wheel has again adjusted to that of the rotor.

10. The method according to claim 9, wherein adjustment of the angular velocity of the rotor is carried out by energization of the coil groups.

11. A planar drive system, comprising:

at least one stator assembly each comprising a plurality of coil groups for generating a stator magnetic field, and a stator surface, further comprising at least one rotor having a plurality of magnet units for generating a rotor magnetic field, wherein the at least one rotor is drivable above the stator surface with aid of a magnetic coupling between the stator magnetic field and the rotor magnetic field, wherein the planar drive system further comprises a controller, wherein the controller is configured to output control commands to the stator assemblies of the planar drive system to energize the coil groups in such a way that the rotor rotates, and wherein an object positioned on the rotor is processed with aid of rotation of the rotor, and wherein prior to rotation the rotor with the object is moved to a dispensing unit for a liquid, wherein a liquid is applied to the object, and wherein rotational movement of the rotor creates a rotational coating of the liquid on the object.

12. A method for processing an object with a planar drive system according to claim 11, wherein in the rotational position the rotor is rotatable about a rotational axis perpendicular to the stator surface, and the method comprising the following steps:

energizing the coil groups in such a way that the rotor moves to the rotational position;

energizing the coil groups in such a way that the rotor rotates; and processing the object with aid of the rotation of the rotor;

wherein prior to said rotation the rotor with the object is moved to said dispensing unit for the liquid, wherein the liquid is applied to the object, and wherein the rotational movement of the rotor creates the rotational coating of the liquid on the object.

13. A planar drive system, comprising:

at least one stator assembly each comprising a plurality of coil groups for generating a stator magnetic field, and a stator surface, further comprising at least one rotor having a plurality of magnet units for generating a rotor magnetic field, wherein the at least one rotor is drivable above the stator surface with aid of a magnetic coupling between the stator magnetic field and the rotor magnetic field, wherein the planar drive system further comprises a controller, wherein the controller is configured to output control commands to the stator assemblies of the planar drive system to energize the coil groups in such a way that the rotor rotates, and wherein the rotor comprises a turnstile extending beyond dimensions of the rotor, wherein objects are influenced with aid of the turnstile.

14. A method for processing objects with a planar drive system according to claim 13, wherein the rotor comprises said turnstile extending beyond said dimensions of the rotor, and wherein in the rotational position the rotor is rotatable about a rotational axis perpendicular to the stator surface, the method comprising the following steps:

energizing the coil groups in such a way that the rotor moves to the rotational position;

energizing the coil groups in such a way that the rotor rotates; and processing the objects with aid of the rotation of the rotor, wherein said objects are influenced with the aid of the turnstile.

15. The method according to claim 14, wherein the turnstile affects an object stream of said objects.

16. The method according to claim 15, wherein the turnstile influences said objects of the object stream with respect to an object distance.

17. A planar drive system, comprising:

at least one stator assembly each comprising a plurality of coil groups for generating a stator magnetic field, and a stator surface, further comprising at least one rotor having a plurality of magnet units for generating a rotor magnetic field, wherein the at least one rotor is drivable above the stator surface with aid of a magnetic coupling between the stator magnetic field and the rotor magnetic field, wherein the planar drive system further comprises a controller, wherein the controller is configured to output control commands to the stator assemblies of the planar drive system to energize the coil groups in such a way that the rotor rotates, and wherein an alignment of an object arranged on the rotor is determined with aid of a camera, the alignment of the object being achieved by rotating the rotor.

18. A method for processing an object with a planar drive system according to claim 17, wherein in the rotational position the rotor is rotatable about a rotational axis perpendicular to the stator surface, and the method comprising the following steps:

energizing the coil groups in a such a way that the rotor moves to the rotational position;

energizing the coil groups in such a way that the rotor rotates; and processing the object with aid of the rotation of the rotor;

wherein the alignment of the object arranged on the rotor is determined with the aid of said camera, and wherein the alignment of the object is achieved by rotating the rotor.

* * * * *